United States Patent
Ichikawa

(10) Patent No.: US 9,123,945 B2
(45) Date of Patent: Sep. 1, 2015

(54) FUEL CELL WITH ELECTROLYTE ELECTRODE ASSEMBLY PROJECTIONS FORMING REACTANT GAS CHANNEL

(75) Inventor: Hiroshi Ichikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 420 days.

(21) Appl. No.: 13/140,781

(22) PCT Filed: Dec. 3, 2009

(86) PCT No.: PCT/JP2009/070630
§ 371 (c)(1),
(2), (4) Date: Jun. 17, 2011

(87) PCT Pub. No.: WO2010/071066
PCT Pub. Date: Jun. 24, 2010

(65) Prior Publication Data
US 2011/0250524 A1    Oct. 13, 2011

(30) Foreign Application Priority Data
Dec. 19, 2008  (JP) .................... 2008-323970

(51) Int. Cl.
*H01M 8/10*    (2006.01)
*H01M 8/24*    (2006.01)
(Continued)

(52) U.S. Cl.
CPC .......... *H01M 8/2425* (2013.01); *H01M 4/8621* (2013.01); *H01M 4/8626* (2013.01);
(Continued)

(58) Field of Classification Search
CPC ............ H01M 4/8621; H01M 4/8626; H01M 8/0276; H01M 8/1206; H01M 8/2425; H01M 8/0247; H01M 8/0282; Y02E 60/525; Y02E 60/521

USPC ................................................ 429/482, 490
See application file for complete search history.

(56) References Cited

U.S. PATENT DOCUMENTS 7,273,673 B2    9/2007  Akikusa et al.
7,396,384 B2 *  7/2008  Barker et al. .................... 95/55
(Continued)

FOREIGN PATENT DOCUMENTS

EP    1796192 A1    6/2007
JP    2002-203579   7/2002
(Continued)

OTHER PUBLICATIONS

European Office Action for Application No. 09771595.7, 6 pages, dated Sep. 3, 2012.
(Continued)

*Primary Examiner* — Gary Harris
(74) *Attorney, Agent, or Firm* — Nelson Mullins Riley & Scarborough LLP; Anthony A. Laurentano

(57) ABSTRACT

A fuel cell includes an electrolyte electrode assembly and a first separator and a second separator sandwiching the electrolyte electrode assembly. The first and second separators have flat surfaces stacked on the electrolyte electrode assembly. The electrolyte electrode assembly includes an anode having a plurality of anode projections. The anode projections contact the first separator and form a fuel gas channel between the anode and the first separator. Further, the electrolyte electrode assembly includes a cathode having a plurality of cathode projections. The cathode projections contact the second separator and form an oxygen-containing gas channel between the cathode and the second separator.

14 Claims, 25 Drawing Sheets

(51) Int. Cl.
*H01M 4/86* (2006.01)
*H01M 8/12* (2006.01)
*H01M 8/02* (2006.01)

(52) U.S. Cl.
CPC .......... *H01M8/0276* (2013.01); *H01M 8/1206* (2013.01); *H01M 8/0247* (2013.01); *H01M 8/0282* (2013.01); *Y02E 60/521* (2013.01); *Y02E 60/525* (2013.01)

(56) References Cited

U.S. PATENT DOCUMENTS

| | | |
|---|---|---|
| 7,648,789 B2 | 1/2010 | Rodrigo et al. |
| 2002/0164517 A1 | 11/2002 | Sato et al. |
| 2003/0082434 A1* | 5/2003 | Wang et al. .................. 429/40 |
| 2003/0215678 A1 | 11/2003 | Barton et al. |
| 2004/0234837 A1* | 11/2004 | Dan .............................. 429/38 |
| 2005/0238943 A1* | 10/2005 | Akiyama et al. ............. 429/38 |
| 2007/0134539 A1* | 6/2007 | Chung et al. ................. 429/35 |
| 2007/0287053 A1 | 12/2007 | Ichioka |
| 2009/0098439 A1* | 4/2009 | Homma ......................... 429/34 |

FOREIGN PATENT DOCUMENTS

| | | |
|---|---|---|
| JP | 2002-237312 | 8/2002 |
| JP | 2003-272658 | 9/2003 |
| JP | 2004-522285 | 7/2004 |
| JP | 2006-253071 | 9/2006 |
| JP | 2008-146905 | 6/2008 |
| WO | 00/76015 A1 | 12/2000 |

OTHER PUBLICATIONS

Japanese Office Action for Application No. 2008-323970, 3 pages, dated Apr. 23, 2013.
International Search Report for Application No. PCT/JP2009/070630, dated Mar. 29, 2010.

* cited by examiner

FUEL CELL WITH ELECTROLYTE ELECTRODE ASSEMBLY PROJECTIONS FORMING REACTANT GAS CHANNEL

RELATED APPLICATIONS

This application is a 35 U.S.C. 371 national stage filing of International Application No. PCT/JP2009/070630, filed Dec. 3, 2009, which claims priority to Japanese Patent Application No. 2008-323970 filed on Dec. 19, 2008 in Japan. The contents of the aforementioned applications are hereby incorporated by reference.

TECHNICAL FIELD

The present invention relates to a fuel cell including an electrolyte electrode assembly and separators sandwiching the electrolyte electrode assembly. The electrolyte electrode assembly includes an anode, a cathode, and an electrolyte interposed between the anode and the cathode.

BACKGROUND ART

Typically, solid oxide fuel cells (SOFC) employ an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, generally, predetermined numbers of the separators and the electrolyte electrode assemblies are stacked together to form a fuel cell stack.

In the fuel cell, a fuel gas such as a hydrogen gas and an oxygen-containing gas such as the air need to be supplied to the anode and the cathode of the electrolyte electrode assembly, respectively. Further, improvement in the current collection efficiency needs to be achieved.

In a fuel cell disclosed in Japanese Laid-Open Patent Publication No. 2004-522285 (PCT), as shown in FIG. 23, a fuel cell plate 1a and a gas separator plate 2a are stacked together. Each of the fuel cell plate 1a and the gas separator plate 2a has a circular shape. In the fuel cell plate 1a, a cathode layer 4a and an anode layer 5a are formed on both surfaces of an electrolyte layer 3a. Electrically-conductive passages 7a passing through an electrode-contacting zone 6a are formed in the gas separator plate 2a. The electrically-conductive passages 7a are made of silver or silver based material as electrically conductive material.

Further, in a solid oxide fuel cell disclosed in Japanese Laid-Open Patent Publication No. 2002-237312, as shown in FIG. 24, a power generation cell 1b, and a pair of metal separators 2b for supplying a fuel gas to a fuel electrode layer and an oxygen-containing gas to an air electrode layer are provided. A fuel electrode current collector 3b is interposed between a fuel electrode layer of the power generation cell 1b and one of the metal separators 2b, and an air electrode current collector 4b is interposed between the air electrode layer of the power generation cell 1b and the other of the metal separators 2b. The metal separator 2b is plated with silver or silver alloy. Further, the air electrode current collector 4b is made of porous material containing silver or silver alloy, or non-porous material formed by coating porous material containing silver or metal other than silver with silver or silver alloy.

Further, in a fuel cell disclosed in Japanese Laid-Open Patent Publication No. 2006-253071, as shown in FIG. 25, a fuel electrode 1c made of porous material, an electrolyte membrane 2c provided on one of front and back surfaces of the fuel electrode 1c, an air electrode membrane 3c formed on the electrolyte membrane 2c, air flow passages 4c having grooves formed in a matrix pattern on the other surface of the fuel electrode 1c for supplying the air to the air electrode membrane 3c of the adjacent fuel cell, an interconnector membrane 5c formed on the surface having the air flow passages 4c are provided. The fuel electrode 1c has a plurality of fuel gas flow passages 6c.

SUMMARY OF INVENTION

However, in Japanese Laid-Open Patent Publication No. 2004-522285 (PCT), since the electrically-conductive passages 7a of silver or silver material are provided in the electrode-contacting zone 6a, the cost is high. Further, since the electrically-conductive passages 7a pass through the electrode-contacting zone 6a, and the electrically-conductive passages 7a are covered with the electrically-conductive coating layer, the production cost of the gas separator plate 2a is considerably high.

In Japanese Laid-Open Patent Publication No. 2002-237312, since the metal separator 2b is plated using silver or silver alloy, the production cost of the metal separator 2b is high. Further, since the air electrode current collector 4b is made of porous material containing silver or silver alloy, a larger number of parts are required, and the cost is high.

Further, in Japanese Laid-Open Patent Publication 2006-253071, since the fuel electrode 1c has the air flow passages 4c, the interconnector membrane 5c, and the fuel gas flow passages 6c, the structure and the production process are complicated. Further, since the fuel gas flow passages 6c are provided in the fuel electrode 1c, the fuel electrode 1c becomes thick, and reduction in the overall thickness of the fuel cell cannot be achieved.

The present invention has been made to solve the problems of these types, and an object of the present invention is to provide a fuel cell having simple and compact structure in which improvement in the power generation efficiency and the durability is achieved, and the production cost is reduced easily.

The present invention relates to a fuel cell including an electrolyte electrode assembly and separators sandwiching the electrolyte electrode assembly. The electrolyte electrode assembly includes an anode, a cathode, and an electrolyte interposed between the anode and the cathode.

Each of the separators has a flat surface stacked on the electrolyte electrode assembly, and at least one of the anode and the cathode of the electrolyte electrode assembly has a plurality of projections, and the projections contact the separator and form a reactant gas channel between the separator and the anode or the cathode.

In the present invention, since the portions of the separators stacked on the electrolyte electrode assembly are flat surfaces, no projections need to be formed on both surfaces of the separators by pressing or by etching. Therefore, dies and dedicated machining devices are not required. The production cost of the fuel cell is reduced suitably.

Further, since the projections are provided on the electrolyte electrode assembly, the separators tightly contact the projections effectively. Thus, improvement in power collection efficiency is achieved advantageously. Further, non-uniform load applied to the electrolyte electrode assembly is reduced, and improvement in the gas diffusion characteristics is achieved easily. Accordingly, the power generation efficiency and the durability of the fuel cell are improved suitably.

The above and other objects, features, and advantages of the present invention will become more apparent from the

DESCRIPTION OF EMBODIMENTS

Figure 1:
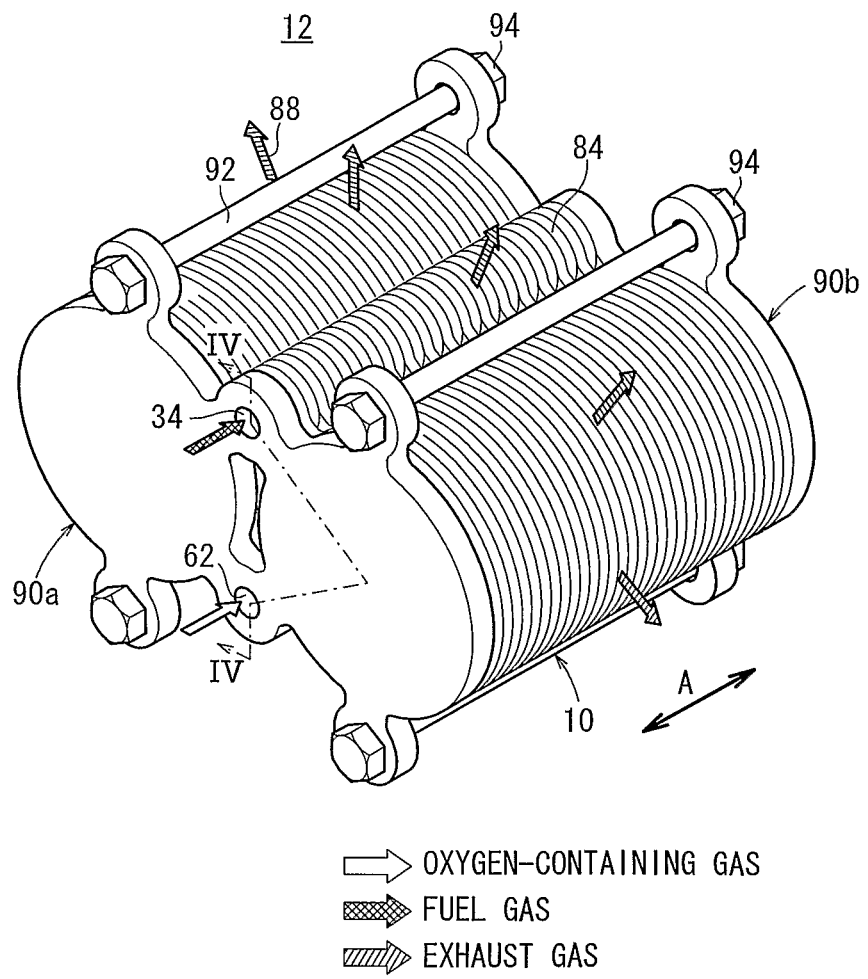
FIG. 1 is a perspective view schematically showing a fuel cell stack formed by stacking a plurality of fuel cells according to a first embodiment of the present invention.

FIG. 1 is perspective view schematically showing a fuel cell stack 12 formed by stacking a plurality of fuel cells 10 according to a first embodiment of the present invention in a direction indicated by an arrow A. The fuel cell stack 12 is used in various applications, including stationary and mobile applications. For example, the fuel cell 10 is mounted on a vehicle.

Figure 2:
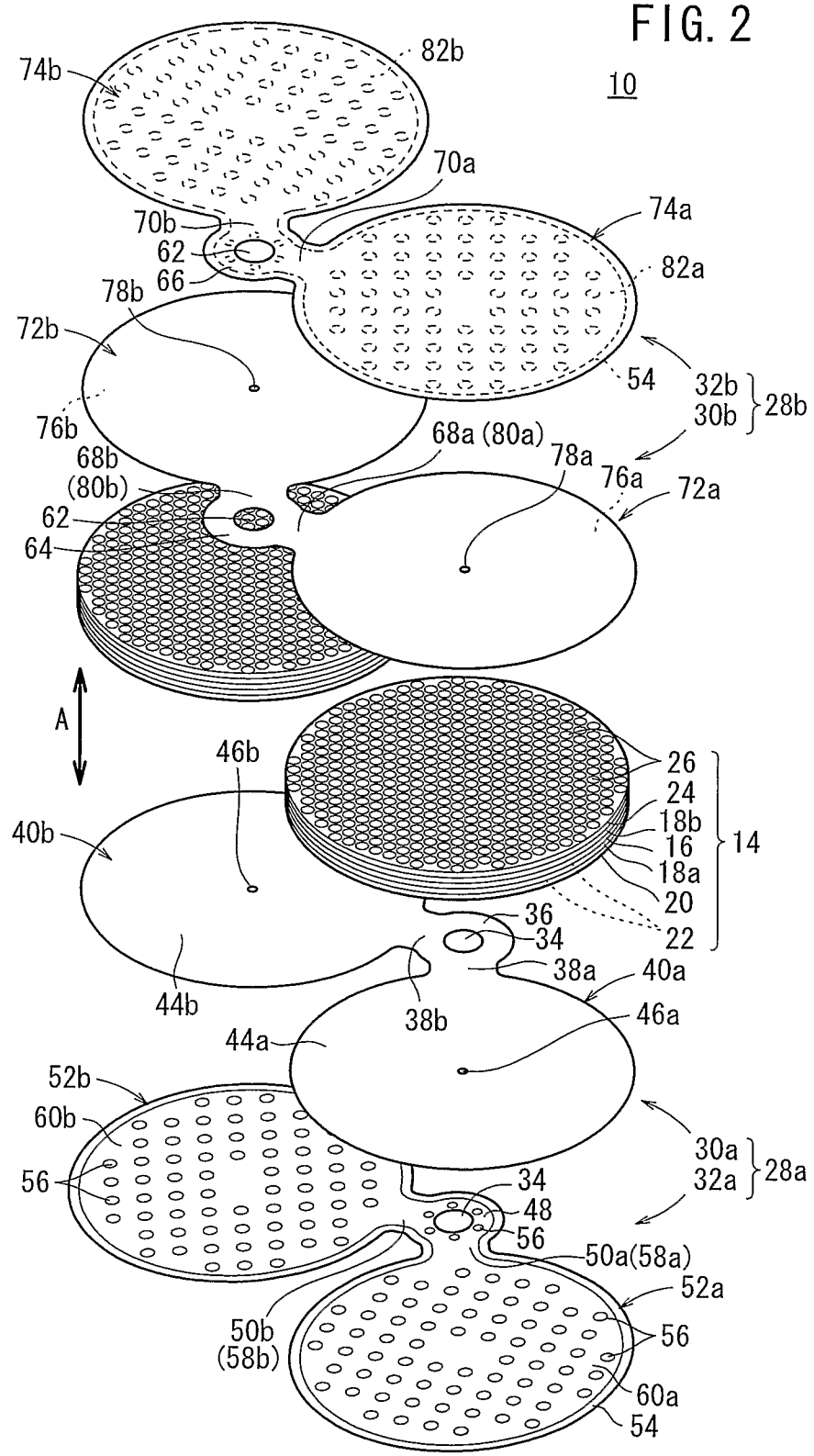
FIG. 2 is an exploded perspective view schematically showing the fuel cell.
Figure 3:
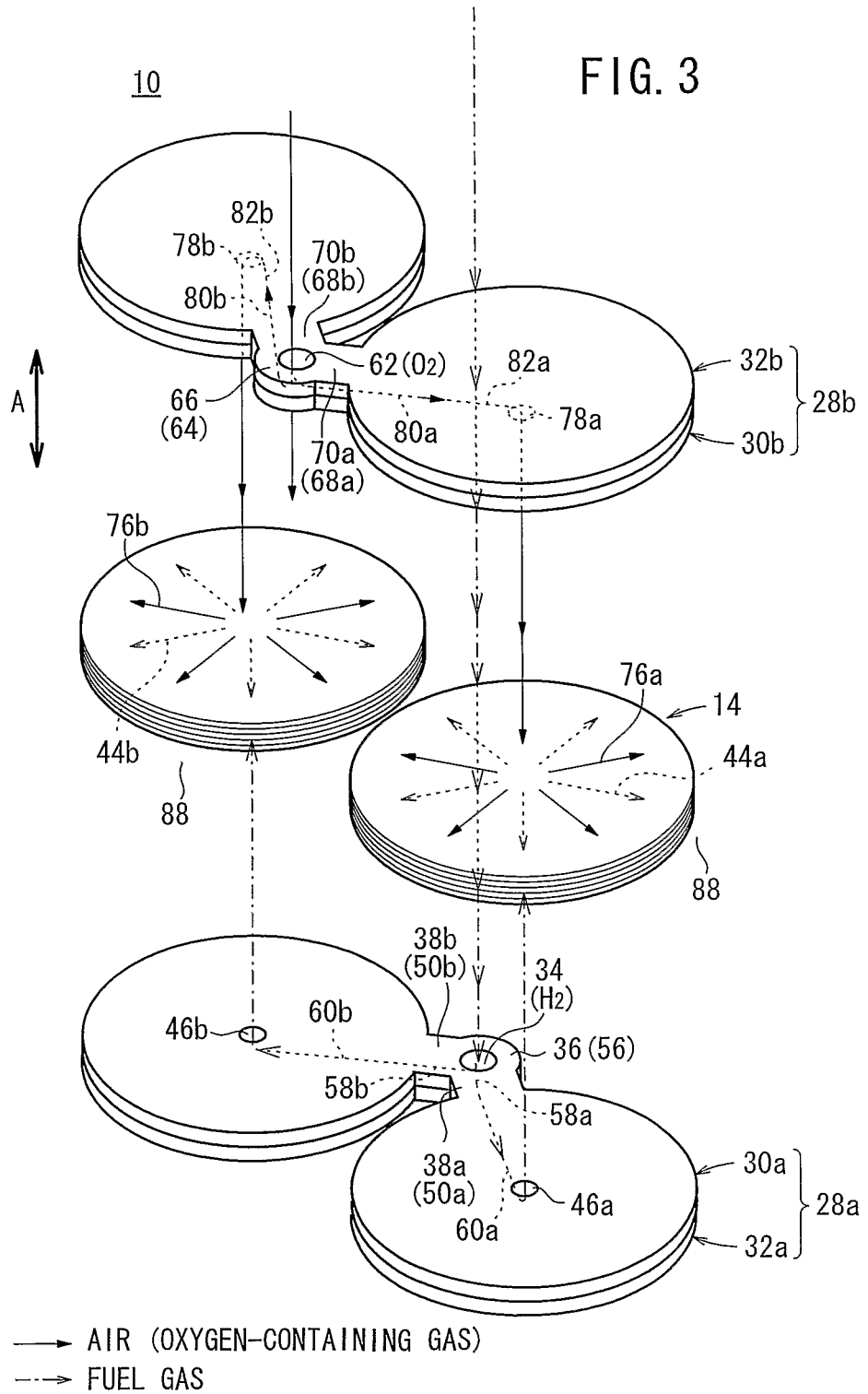
FIG. 3 is a partial exploded perspective view of the fuel cell showing gas flows in the fuel cell.
Figure 4:
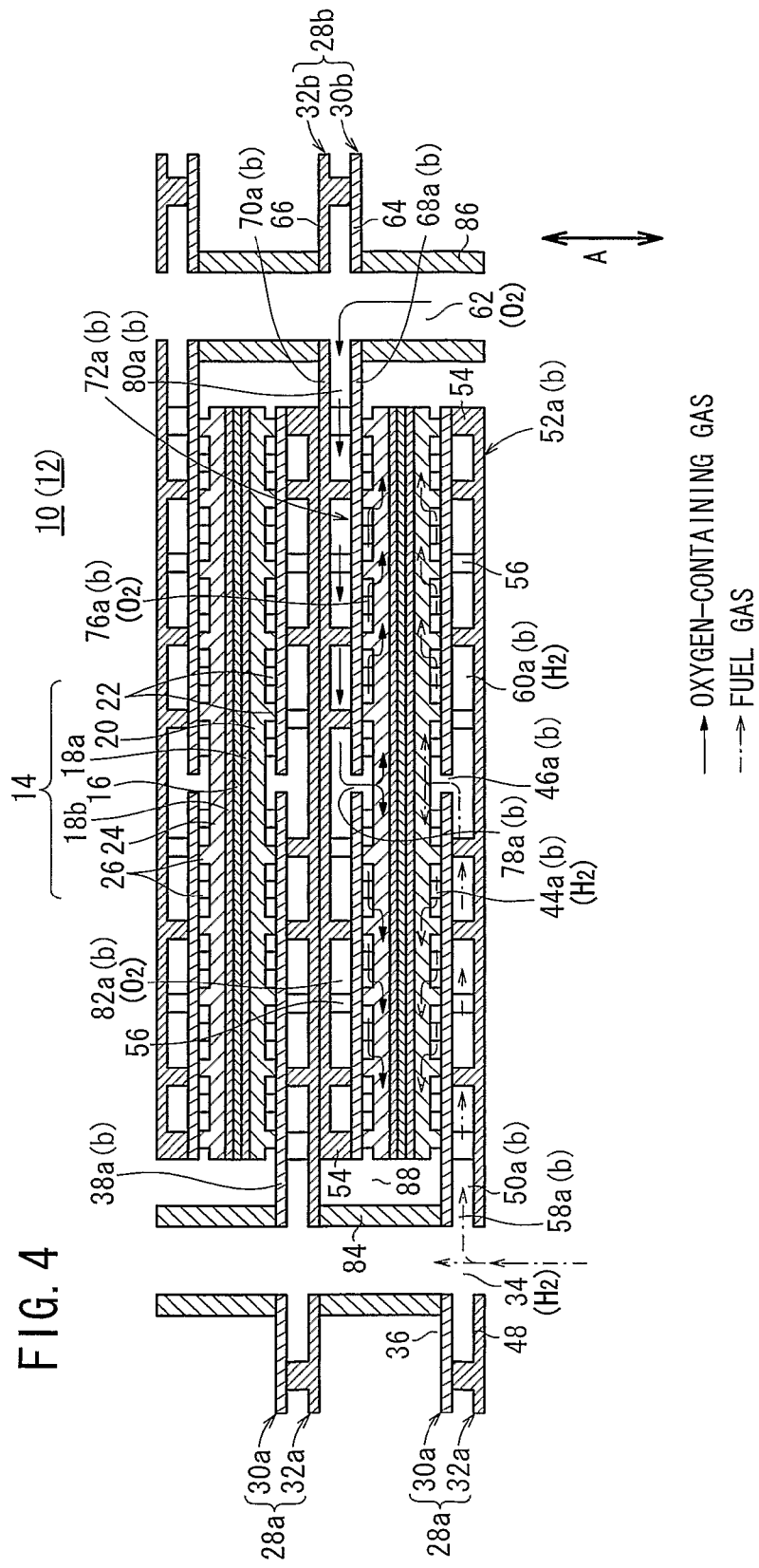
FIG. 4 is a cross sectional view taken along a line IV-IV in FIG. 1 of the fuel cell stack.

The fuel cell 10 is a flat plate type solid oxide fuel cell. As shown in FIGS. 2 to 4, the fuel cell 10 includes electrolyte electrode assemblies 14. Each of the electrolyte electrode assemblies 14 includes an electrolyte (electrolyte plate) 16. An anode 20 is provided on one surface of the electrolyte 16 such that an intermediate layer (pore sealing layer) 18a is interposed between the anode 20 and the electrolyte 16. The anode 20 has a plurality of anode projections (first projections) (current collection buffer layer) 22.

A cathode 24 is provided on the other surface of the electrolyte 16 such that an intermediate layer (reaction prevention layer) 18b is interposed between the cathode 24 and the electrolyte 16. The cathode 24 has a plurality of cathode projections (second projections) (current collection buffer layer) 26.

The electrolyte 16 is made of an ion conductive oxide such as stabilized zirconia. In particular, the electrolyte is made of Yttria-Stabilized Zirconia (YSZ). Alternatively, the electrolyte 16 may be made of any of ion conductive oxides such as Samarium Doped Ceria (SDC), Scandia Stabilized Zirconia (ScSZ), lanthanum gallate based oxides such as Sr- and Mg-doped $LaGaO_3$ (LSGM) and Co-doped LSGM (LSGMC), Gadolinium Doped Ceria (GDC), and Yttria Doped Ceria (YDC).

For example, the anode 20 is made of cermet of Nickel-Yttria Stabilized Zirconia (Ni-YSZ), cermet of Nickel-Samarium Doped Ceria (Ni-SDC), cermet of Nickel-Scandia Stabilized Zirconia (Ni-ScSZ), or the like.

For example, the cathode 24 is made of Lanthanum Strontium Cobalt Ferrite (LSCF), Lanthanum Strontium Manganite (LSM), Lanthanum Strontium Cobaltite (LSC), Barium Strontium Cobaltite (BSC), Barium Strontium Cobalt Ferrite (BSCF), Samarium Strontium Cobaltite (SSC) or the like.

The intermediate layer 18a is made of the same material as that of the anode 20. The porosity and the pore size of the intermediate layer 18a are smaller than those of the anode 20. For example, the intermediate layer 18b is made of Gadolinium Doped Ceria (GDC), Samarium Doped Ceria (SDC), Yttria Doped Ceria (YDC), or the like.

For example, the anode projections 22 are made of Nickel Oxide (NiO), cermet of Nickel-Yttria Stabilized Zirconia (Ni-YSZ), cermet of Nickel-Samarium Doped Ceria (Ni-SDC), cermet of Nickel-Scandia Stabilized Zirconia (Ni-ScSZ), or the like.

For example, the cathode projections 26 are made of Lanthanum Strontium Cobalt Ferrite (LSCF), Lanthanum Strontium Manganite (LSM), Lanthanum Strontium Cobaltite (LSC), Lanthanum Cobaltite (LC), Barium Strontium Cobaltite (BSC), Barium Strontium Cobalt Ferrite (BSCF), Samarium Strontium Cobaltite (SSC), or the like.

Figure 5:
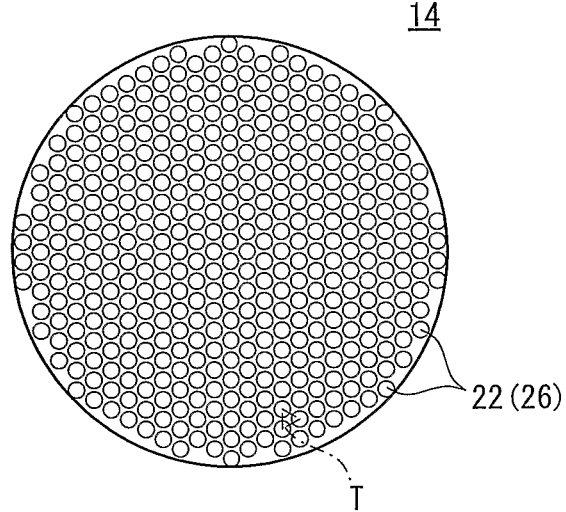
FIG. 5 is a front view showing an electrolyte electrode assembly of the fuel cell.

As shown in FIG. 5, every adjacent three of the anode projections 22 are positioned at vertices of a virtual equilateral triangle T. Likewise, every adjacent three of the cathode projections 26 are positioned at vertices of a virtual equilateral triangle T.

The numbers of the anode projections 22 and the cathode projections 26 that are arranged in the same phase with each other (in alignment with each other) in the stacking direction of the separators 28a, 28b are larger than the numbers of the anode projections 22 and the cathode projections 26 that are arranged in different phases (out of alignment with each other).

The electrolyte electrode assembly 14 has a circular disk shape. A barrier layer (not shown) is provided at least at the outer circumferential edge of the electrolyte electrode assembly 14 for preventing the entry or discharge of the oxygen-containing gas or the fuel gas.

As shown in FIGS. 2 and 3, the fuel cell 10 is formed by sandwiching a plurality of, e.g., two electrolyte electrode assemblies 14 between a first separator 28a and a second separator 28b. The first separator 28a and the second separator 28b comprise separator bodies having the same shape in the reverse relation.

The first separator 28a includes a first plate 30a and a second plate 32a. The first and second plates 30a, 32a are metal plates of, e.g., stainless. The first plate 30a and the second plate 32a are joined to each other by diffusion bonding, laser welding, brazing, or the like.

The first plate 30a has a substantially planar shape, and includes a fuel gas supply section 36. A fuel gas supply passage 34 extends through the fuel gas supply section 36 for supplying the fuel gas in the stacking direction indicated by the arrow A. The fuel gas supply section 36 is integral with first sandwiching sections 40a, 40b through first bridges 38a, 38b extending outwardly from the fuel gas supply section 36.

The first sandwiching sections 40a, 40b and the electrolyte electrode assemblies 14 have substantially the same size. The surfaces of the first sandwiching sections 40a, 40b which contact (which are stacked on) the anode projections 22 of the electrolyte electrode assembly 14 are flat surfaces. Fuel gas channels 44a, 44a for supplying the fuel gas along the electrode surfaces of the anodes 20 are formed between the anode projections 22 and the first sandwiching sections 40a, 40b. The anode projections 22 have a current collection function. Fuel gas inlets 46a, 46b for supplying the fuel gas to substantially central regions of the anodes 20 are formed at substantially central positions of the first sandwiching sections 40a, 40b.

The second plate 32a has a fuel gas supply section 48, and the fuel gas supply passage 34 extends through the fuel gas supply section 48. The fuel gas supply section 48 is integral with first sandwiching sections 52a, 52b through two first bridges 50a, 50b extending outwardly from the fuel gas supply section 48. A circumferential protrusion 54 is provided in an outer circumferential portion of the second plate 32a. The circumferential protrusion 54 protrudes toward the first plate 30a, and is joined to the first plate 30a.

A plurality of projections 56 are formed on surfaces of the fuel gas supply section 48, the first bridges 50a, 50b, and the first sandwiching sections 52a, 52b facing the first plate 30a. The projections 56 contact the first plate 30a to prevent collapsing due to load in the stacking direction.

Fuel gas supply channels 58a, 58b connected to the fuel gas supply passage 34 are formed between the first bridges 38a, 50a, and between the first bridges 38b, 50b. The fuel gas supply channel 58a, 58b are connected to the fuel gas inlets 46a, 46b through fuel gas filling chambers 60a, 60b formed between the first sandwiching sections 40a, 52a, and between the first sandwiching sections 40b, 52b.

The first separator 28a and the second separator 28b have the same shape. The second separator 28b includes a first plate 30b and a second plate 32b corresponding to the first plate 30a and the second plate 32a. The first plate 30b and the second plate 32b have oxygen-containing gas supply sections 64, 66. An oxygen-containing gas supply passage 62 extends through the oxygen-containing gas supply sections 64, 66 for supplying the oxygen-containing gas in the stacking direction.

In the first plate 30b and the second plate 32b, the oxygen-containing gas supply sections 64, 66 are integral with second sandwiching sections 72a, 72b, 74a, 74b through two second bridges 68a, 68b and two second bridges 70a, 70b extending outwardly from the oxygen-containing gas supply sections 64, 66, respectively.

The second sandwiching sections 72a, 72b and the electrolyte electrode assemblies 14 have substantially the same size. The surfaces of the second sandwiching sections 72a, 72b which contact (which are stacked on) the cathodes 24 of the electrolyte electrode assembly 14 are flat surfaces. Oxygen-containing gas channels 76a, 76b for supplying the oxygen-containing gas along the electrode surfaces of the cathodes 24 are formed between the cathode projections 26 and the second sandwiching sections 72a, 72b. The cathode projections 26 have a current collection function. Oxygen-containing gas inlets 78a, 78b for supplying the oxygen-containing gas to substantially central regions of the cathodes 24 are formed at substantially central positions of the second sandwiching sections 72a, 72b.

The second plate 32b is joined to the first plate 30b to form oxygen-containing gas supply channels 80a, 80b between the second bridges 68a, 70a, and between the second bridges 68b, 70b, which are connected to the oxygen-containing gas supply passage 62. Oxygen-containing gas filling chambers 82a, 82b are formed in the second sandwiching sections 74a, 74b. The oxygen-containing gas supply passage 62 is connected to the oxygen-containing gas filling chambers 82a, 82b through the oxygen-containing gas supply channels 80a, 80b.

As shown in FIG. 4, a first insulating seal 84 for sealing the fuel gas supply passage 34 and a second insulating seal 86 for sealing the oxygen-containing gas supply passage 62 are formed between the adjacent fuel cells 10. The first insulating seal 84 and the second insulating seal 86 having good sealing performance are hard, and cannot be collapsed easily. For example, crustal component material such as mica material, glass material, ceramic material, composite material of clay and plastic, or the like may be used for the first insulating seal 84 and the second insulating seal 86. An exhaust gas channel 88 is formed around the electrolyte electrode assemblies 14.

As shown in FIG. 1, the fuel cell stack 12 has a first end plate 90a at one end thereof in the stacking direction of the fuel cells 10, and a second end plate 90b at the other end thereof in the stacking direction of the fuel cells 10. Components between the first end plate 90a and the second end plate 90b are tightened together by a plurality of bolts 92 and nuts 94 in the stacking direction.

Figure 6:
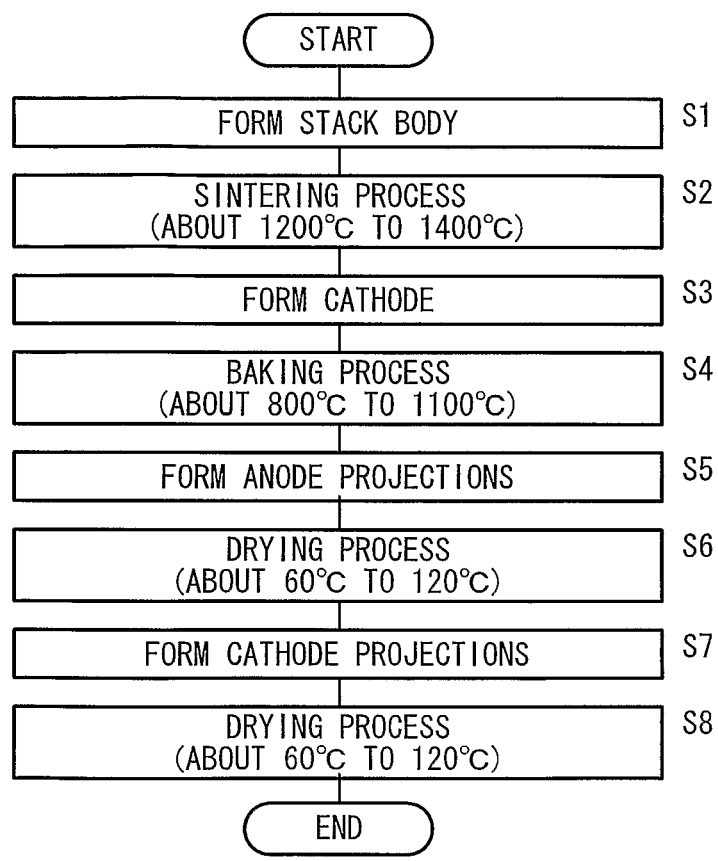
FIG. 6 is a flow chart showing a method of producing the electrolyte electrode assembly.

A process of fabricating the electrolyte electrode assembly 14 of the fuel cell stack 12 will be described with reference to a flow chart in FIG. 6.

Firstly, an intermediate layer 18a and the anode 20 are provided on one surface of the electrolyte 16, and an intermediate layer 18b is provided on the other surface of the electrolyte 16. The stack body is formed by adopting sheet forming, press-bonding, screen printing or the like (step S1).

Then, the stack body is sintered at a temperature in the range of about 1200° C. to 1400° C., and the anode 20, the intermediate layer 18a, the electrolyte 16, and the intermediate layer 18b are formed integrally (step S2). Then, the routine proceeds to step S3 to form the cathode 24 on the intermediate layer 18b of the sintered stack body, e.g., by screen printing. Further, by baking at a temperature in the range of about 800° C. to 1100° C., the cathode 24 is formed integrally into the stack body (step S4).

The routine proceeds to step S5, in which the anode projections 22 are formed on the anode 20, e.g., by screen printing. The anode projections 22 are dried at a temperature in the range of about 60° C. to 120° C. (step S6).

In the meanwhile, the cathode projections 26 are formed on the cathode 24, e.g., by screen printing (step S7). Thereafter, the cathode projections 26 are dried at a temperature in the range of about 60° C. to 120° C. (step S8). The steps S7 and S8 may be carried out before the steps S5 and S6.

After the anode projections 22 and the cathode projections 26 are dried, the anode projections 22 and the cathode projections 26 are assembled to the fuel cell 10. A plurality of the fuel cells 10 are stacked together to form the fuel cell stack 12. The fuel cell stack 12 is operated as described later, and each of the fuel cells 10 becomes hot. By the hot operating temperature, the anode projections 22 and the cathode projections 26 are baked, and fixed to the components of the fuel cells 10.

Next, operation of the fuel cell stack 12 will be described below.

Firstly, as shown in FIG. 1, a fuel gas is supplied to the fuel gas supply passage 34 of the fuel cell stack 12, and an oxygen-containing gas (hereinafter also referred to as the "air") is supplied to the oxygen-containing gas supply passage 62 of the fuel cell stack 12.

As shown in FIGS. 3 and 4, the fuel gas flows in the stacking direction indicated by the arrow A, and flows into the fuel gas supply channels 58a, 58b formed in the first separator 28a of each fuel cell 10. The fuel gas flows along the fuel gas supply channels 58a, 58b between the first bridges 38a, 50a, and between the first bridges 38b, 50b. The fuel gas is temporarily supplied in the fuel gas filling chambers 60a, 60b.

The fuel gas flows through the fuel gas inlets 46a, 46b toward the fuel gas channels 44a, 44b. The fuel gas inlets 46a, 46b are formed at substantially the central positions of the anodes 20 of the electrolyte electrode assemblies 14. Thus, the fuel gas flows from substantially central regions to outer circumferential regions of the anodes 20 along the fuel gas channels 44a, 44b.

The air supplied to the oxygen-containing gas supply passage 62 flows along the oxygen-containing gas supply channels 80a, 80b between the second bridges 68a, 70a and between the second bridges 68b, 70b. The air is temporarily supplied in the oxygen-containing gas filling chambers 82a, 82b. Thereafter, the oxygen-containing gas flows through the oxygen-containing gas inlets 78a, 78b into the oxygen-containing gas channels 76a, 76b.

The oxygen-containing gas inlets 78a, 78b are formed at substantially the central positions of the cathodes 24 of the electrolyte electrode assemblies 14. Thus, the oxygen-containing gas flows from substantially central regions to outer circumferential regions of the cathodes 24.

In each of the electrolyte electrode assemblies 14, the fuel gas is supplied from the central region to the outer circumferential region on the electrode surface of the anode 20 for inducing an electrochemical reaction at the anode 20, and the oxygen-containing gas is supplied from the central region to the outer circumferential region on the electrode surface of the cathode 24 for inducing an electrochemical reaction at the cathode 24. At this time, oxide ions move through the electrolytes 16 to the anodes 20 to generate electricity by the electrochemical reactions.

The consumed fuel containing gas which has passed through the fuel gas channels 44a, 44b and the consumed air containing gas which has passed through the oxygen-containing gas channels 76a, 76b are discharged from the outer circumferential regions of the electrolyte electrode assemblies 14 to the exhaust gas channel 88, and mixed together in the exhaust gas channel 88. The mixed gas is discharged as an exhaust gas having a relatively high temperature.

In the first embodiment, in the first separator 28a, the portions of the first sandwiching sections 40a, 40b stacked on the electrolyte electrode assemblies 14, i.e., the outer surfaces of the first sandwiching sections 40a, 40b are flat surfaces. Likewise, in the second separator 28b, the portions of the second sandwiching sections 72a, 72b stacked on the electrolyte electrode assemblies 14, i.e., the outer surfaces of the second sandwiching sections 72a, 72b are flat surfaces.

In the structure, no projections need to be formed on the outer surfaces of the first separator 28a and/or the second separator 28b by pressing or by etching. Therefore, dies and dedicated machining devices are not required. The production cost of the fuel cell 10 is reduced suitably.

Further, the anode projections 22 are provided on one surface of the electrolyte electrode assembly 14 as necessary, and the cathode projections 26 are provided on the other surface of the electrolyte electrode assembly 14 as necessary. In the structure, the first separator 28a tightly contacts the anode projections 22 and/or the second separator 28b tightly contacts the cathode projections 26 effectively. Thus, improvement in power collection efficiency is achieved advantageously.

Further, non-uniform load applied to the electrolyte electrode assembly 14 is reduced, and improvement in the gas diffusion characteristics is achieved easily. Accordingly, the power generation efficiency and the durability of the fuel cell 10 are improved suitably.

Further, the anode 20 has the anode projections 22 that contact the first separator 28a, and form the fuel gas channels 44a, 44b between the anode 20 and the first separator 28a. The cathode 24 has the cathode protrusions 26 that contact the second separator 28b, and form the oxygen-containing gas channels 76a, 76b between the cathode 24 and the second separator 28b.

Thus, since the anode projections 22 and the cathode projections 26 are provided on both surfaces of the electrolyte electrode assembly 14, the good power collection effect can be obtained due to the anode projections 22 and the cathode projections 26.

The outer surfaces of the first sandwiching sections 40a, 40b and the outer surfaces of the second sandwiching sections 72a, 72b are flat surfaces. In the structure, no projections need to be formed on the outer surfaces of the first separator 28a and the second separator 28b by pressing or by etching. Therefore, dies and dedicated machining devices are not required. The production cost of the fuel cell 10 is reduced suitably.

Further, the numbers of the anode projections 22 and the cathode projections 26 that are arranged in the same phase with each other (in alignment with each other) in the stacking direction of the separators 28a, 28b are larger than the numbers of the anode projections 22 and the cathode projections 26 that are arranged in different phases (out of alignment with each other). In the structure, the first separator 28a tightly contacts the anode projections 22 and the second separator 28b tightly contacts the cathode projections 26 effectively. Thus, power collection efficiency is achieved advantageously. Further, non-uniform load applied to the electrolyte electrode assembly 14 is reduced, and improvement in the gas diffusion characteristics is achieved easily.

Every adjacent three of the anode projections 22 are positioned at vertices of a virtual equilateral triangle T. Likewise, every adjacent three of the cathode projections 26 are positioned at vertices of a virtual equilateral triangle T.

Therefore, unlike the structure, e.g., where projections are arranged in a matrix pattern, the adjacent three anode projections 22 and the adjacent three cathode projections 26 have truss structure. In the structure, a large number of projections can be arranged efficiently. Thus, with the simple structure, improvement in the strength against deformation of the electrolyte electrode assembly 14, and improvement in the product quality are achieved.

Further, since the contact areas between the electrolyte electrode assembly 14 and the first and second separators 28a, 28b are increased, the power generation efficiency is improved suitably. Moreover, since the anode projections 22 are provided close to each other and the cathode projections 26 are provided close to each other, flow-through of the fuel gas and the air is suppressed, and improvement in the power generation efficiency is achieved.

Further, the fuel cell 10 is a flat plate type solid oxide fuel cell. The present invention is suitably applicable to the flat plate-type and high-temperature type solid oxide fuel cell.

Figure 7:
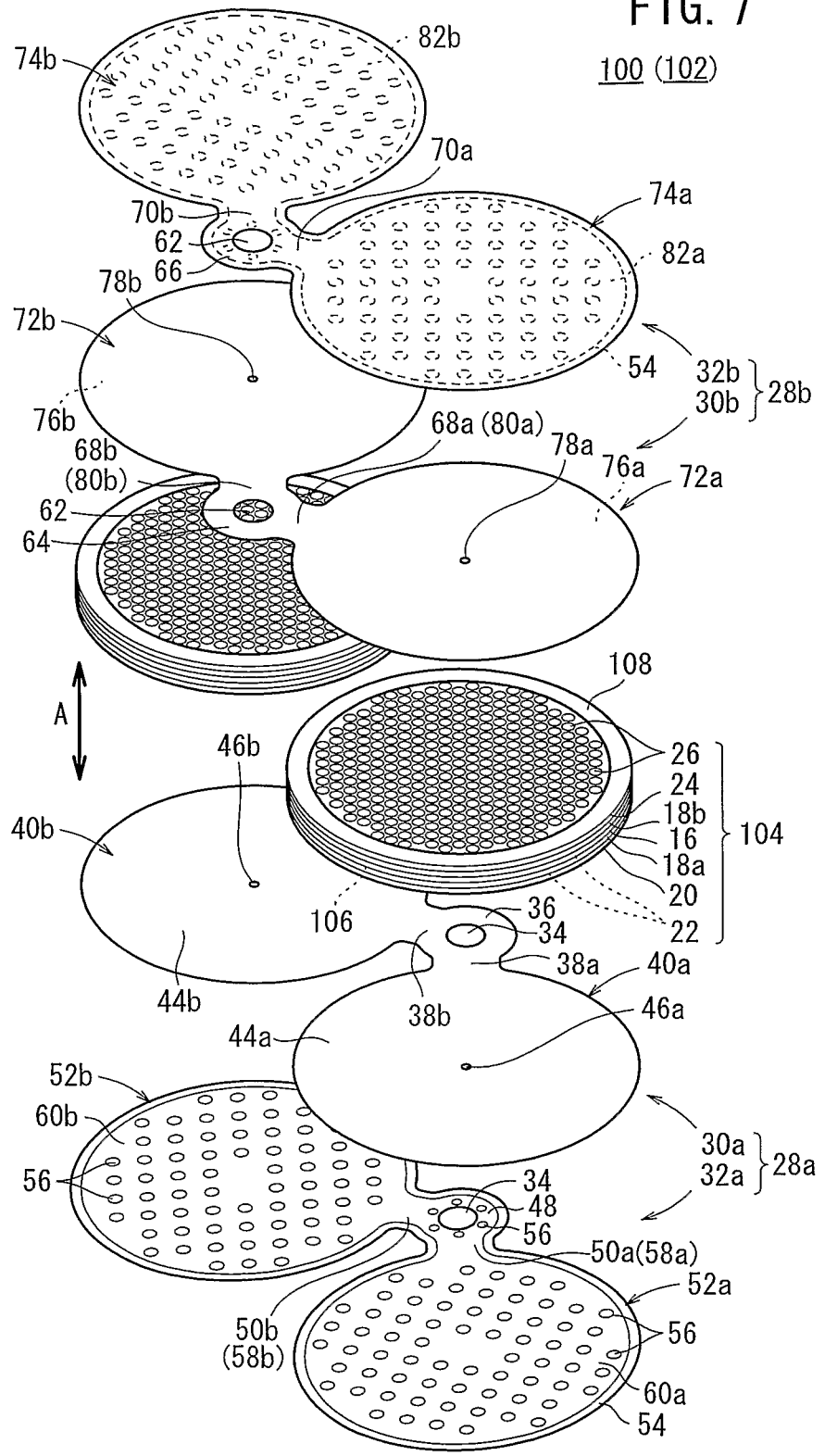
FIG. 7 is an exploded perspective view schematically showing a fuel cell stack formed by stacking fuel cells according to a second embodiment of the present invention.

FIG. 7 is an exploded perspective view schematically showing a fuel cell stack 102 formed by stacking fuel cells 100 according to a second embodiment of the present invention in a direction indicated by an arrow A. The constituent elements that are identical to those of the fuel cell 10 according to the first embodiment are labeled with the same reference numerals, and description thereof will be omitted. Also in a third and later embodiments as described later, the constituent elements that are identical to those of the fuel cell 10 according to the first embodiment are labeled with the same reference numerals, and description thereof will be omitted.

Figure 8:
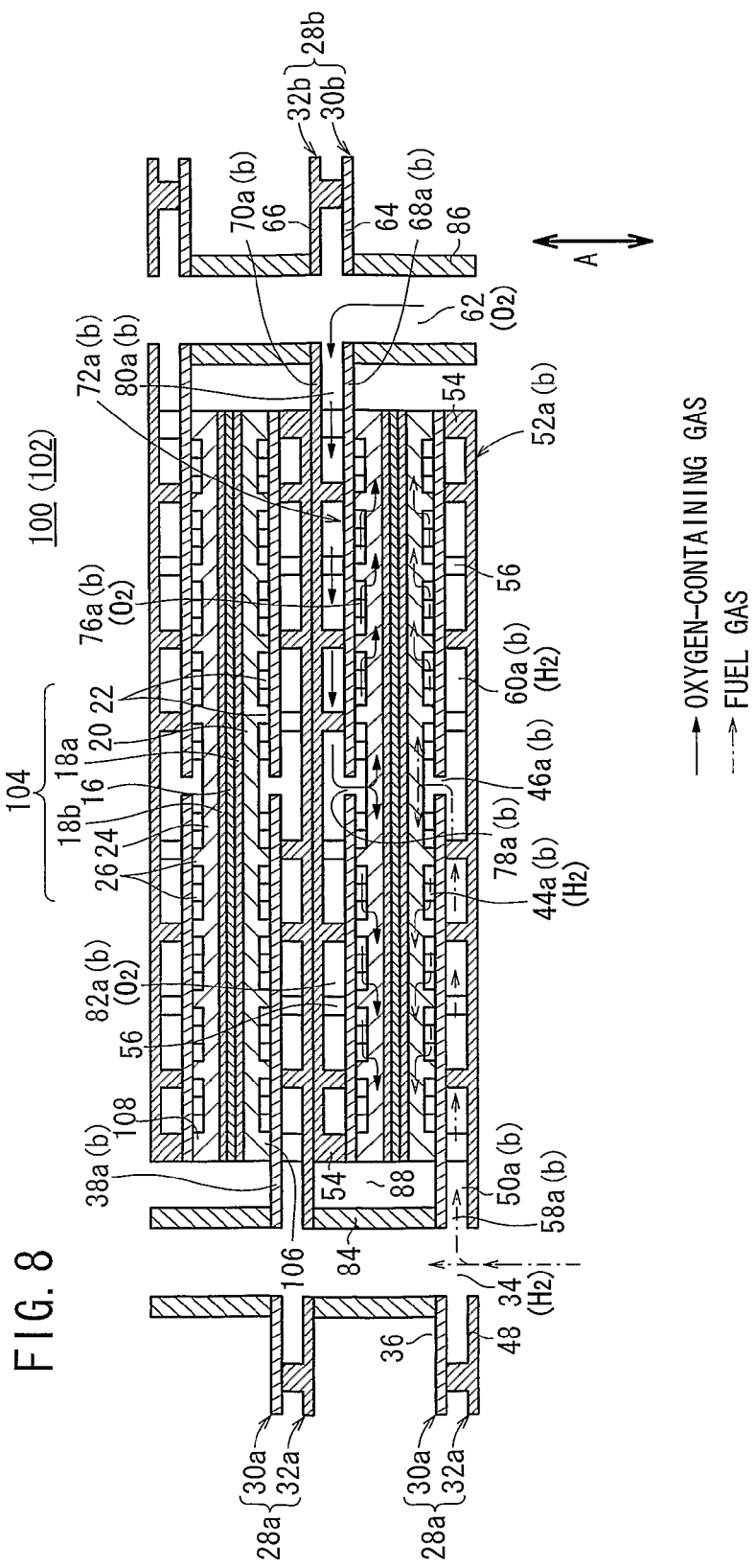
FIG. 8 is a cross sectional view showing a fuel cell stack formed by stacking the fuel cells.
Figure 9:
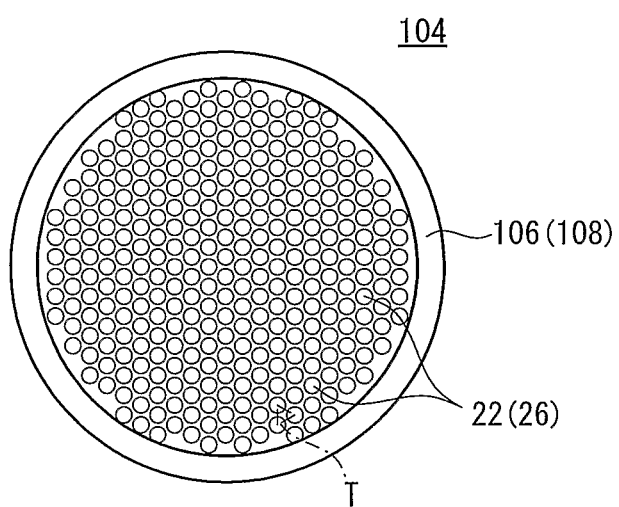
FIG. 9 is a front view showing an electrolyte electrode assembly of the fuel cell.

As shown in FIGS. 7 to 9, the fuel cell 100 includes electrolyte electrode assemblies 104. The anode 20 of the electrolyte electrode assembly 104 has an outer circumferential anode protrusion (first outer circumferential protrusion) 106. The outer circumferential anode protrusion 106 contacts the first separator 28a, and is formed along the outer edge of the anode 20.

The cathode 24 of the electrolyte electrode assembly 104 has an outer circumferential cathode protrusion (second outer circumferential protrusion) 108. The outer circumferential cathode protrusion 108 contacts the second separator 28b, and is formed along the outer edge of the cathode 24. Alternatively, only one of the outer circumferential anode protrusion 106 and the outer circumferential cathode protrusion 108 may be provided.

Figure 10:
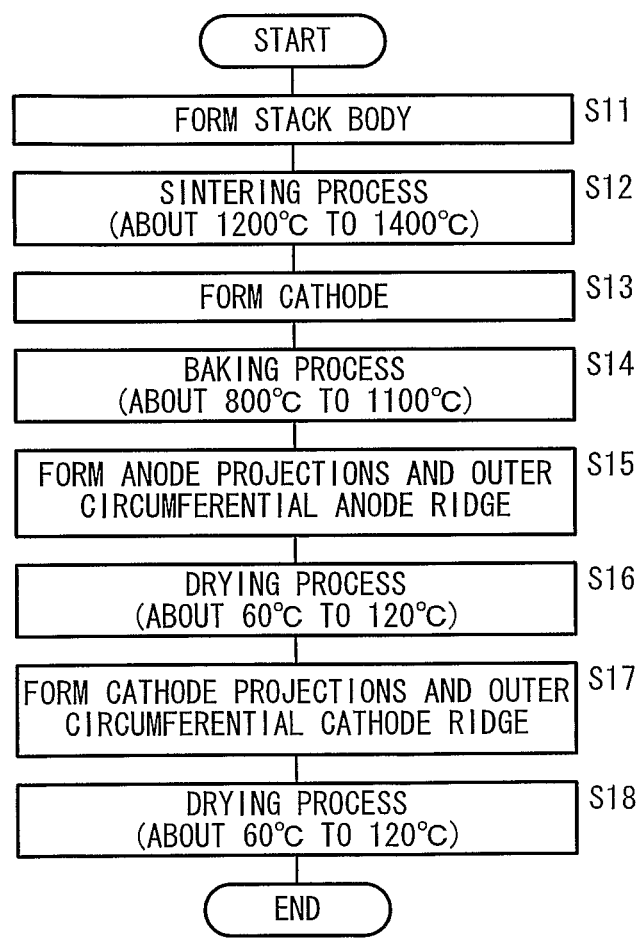
FIG. 10 is a flow chart showing a method of fabricating the electrolyte electrode assembly.

The electrolyte electrode assembly 104 is fabricated according to a flow chart shown in FIG. 10.

In the second embodiment, steps S11 to steps S14 are performed in the same manner as the steps S1 to S4 of the first embodiment, and thereafter, in step S15, the anode projections 22 and the outer circumferential anode protrusion 106 are formed at the same time on the anode 20, e.g., by screen printing. Then, in step S16, the anode projections 22 and the outer circumferential anode protrusion 106 are dried.

In the meanwhile, the cathode projections 26 and the outer circumferential cathode protrusion 108 are formed at the same time on the cathode 24, e.g., by screen printing (step S17). Then, in step S18, the cathode projections 26 and the outer circumferential cathode protrusion 108 are dried.

In the electrolyte electrode assembly 104, the anode 20 has the outer circumferential anode protrusion 106. The outer circumferential anode protrusion 106 contacts the first separator 28a, and is formed along the outer edge of the anode 20. With the simple structure, the first separator 28a tightly contacts the outer circumferential anode protrusion 106. Thus, improvement in power collection efficiency is achieved advantageously. Further, non-uniform load applied to the electrolyte electrode assembly 104 is reduced. Accordingly, the power generation efficiency and the durability of the fuel cell 100 are improved easily.

Further, it becomes possible to prevent entering of the unconsumed oxygen-containing gas and the exhaust gas from the outside of the electrolyte electrode assembly 104 into the anode 20. Accordingly, decrease in the power generation efficiency due to oxidation of the anode 20 is suppressed, and improvement in the durability of the fuel cell 100 is achieved.

Further, flow-through to the outside of the fuel gas flowing in the fuel gas channels 44a, 44b is reliably prevented. Thus, the fuel gas can be utilized effectively in power generation reaction. Accordingly, improvement in the fuel utilization ratio is achieved advantageously.

In the electrolyte electrode assembly 104, the cathode 24 has the outer circumferential cathode protrusion 108. The outer circumferential cathode protrusion 108 contacts the second separator 28b, and is formed along the outer edge of the cathode 24. With the simple structure, the second separator 28b tightly contacts the outer circumferential cathode protrusion 108. Thus, improvement in power collection efficiency is achieved advantageously. Further, non-uniform load applied to the electrolyte electrode assembly 104 is reduced. Accordingly, the power generation efficiency and the durability of the fuel cell 100 are improved easily.

Further, it becomes possible to prevent entering of the unconsumed fuel gas and the exhaust gas from the electrolyte electrode assembly 104 into the cathode 24. Accordingly, decrease in the power generation efficiency of the fuel cell 100 due to reduction of the cathode 24 is suppressed, and improvement in the durability of the fuel cell 100 is achieved easily. Further, flow-through to the outside of the oxygen-containing gas flowing in the oxygen-containing gas channels 76a, 76b is reliably prevented. Thus, the oxygen-containing gas can be utilized effectively in power generation reaction.

Further, since the outer circumferential anode protrusion 106 and the outer circumferential cathode protrusion 108 are provided on both surfaces of the electrolyte electrode assembly 104, the load in the stacking direction can be transmitted reliably between the outer circumferential anode protrusion 106 and the outer circumferential cathode protrusion 108. Thus, improvement in power collection efficiency is achieved advantageously. Further, non-uniform load applied to the electrolyte electrode assembly 104 is reduced.

Moreover, since the outer circumferential anode protrusion 106 and the anode projections 22 are made of the same material, the outer circumferential anode protrusion 106 and the anode projections 22 can be formed at the same time. The production process is simplified, and thus, reduction in the production cost is achieved. Likewise, since the outer circumferential cathode protrusion 108 and the cathode projections 26 are made of the same material, the outer circumferential cathode protrusion 108 and the cathode projections 26 can be formed at the same time. The production process is simplified, and thus, reduction in the production cost is achieved.

Figure 11:
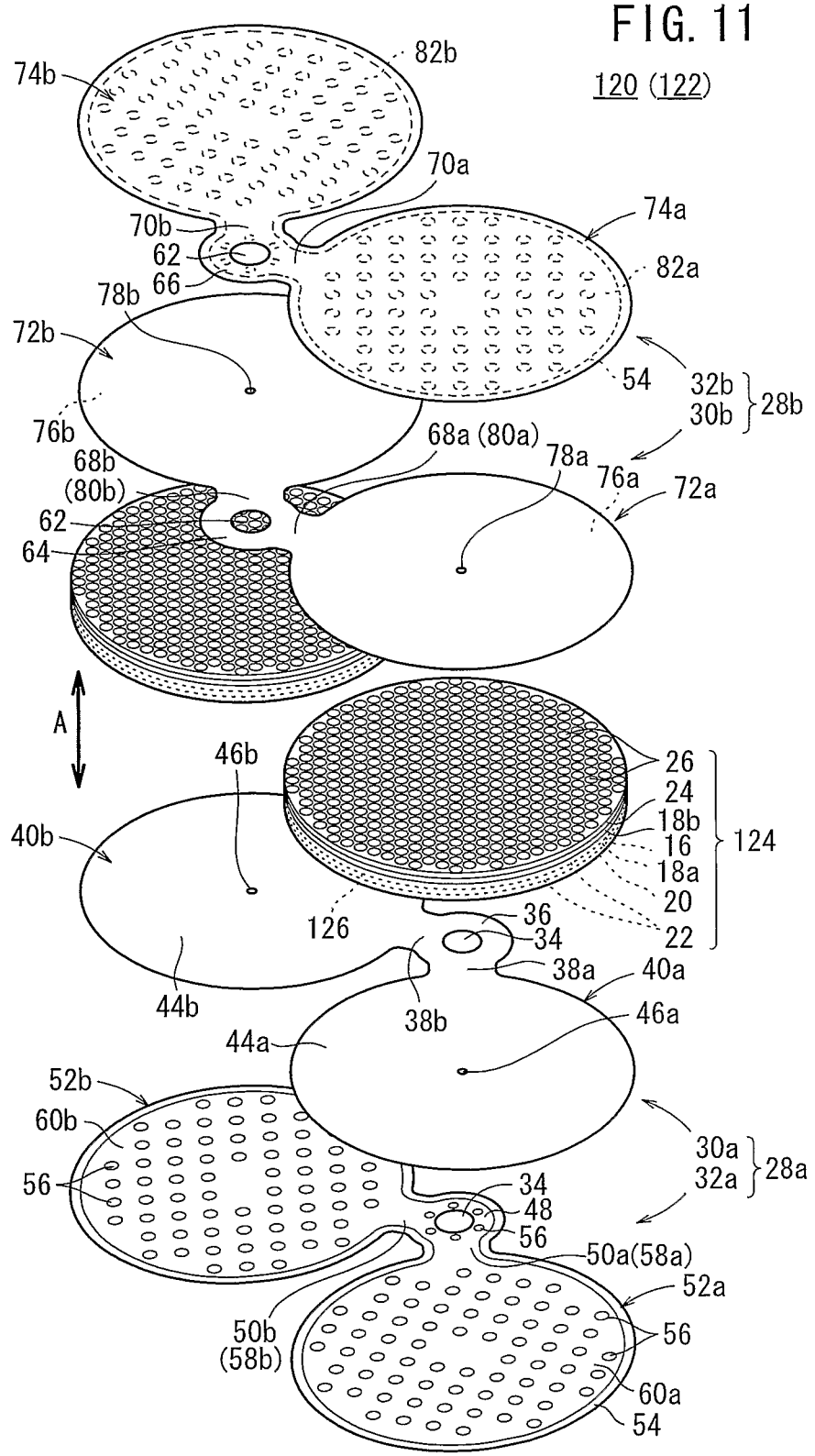
FIG. 11 is an exploded perspective view schematically showing a fuel cell stack formed by stacking fuel cells according to a third embodiment of the present invention.

FIG. 11 is an exploded perspective view schematically showing a fuel cell stack 122 formed by stacking fuel cells 120 according to a third embodiment of the present invention in a direction indicated by an arrow A.

Figure 12:
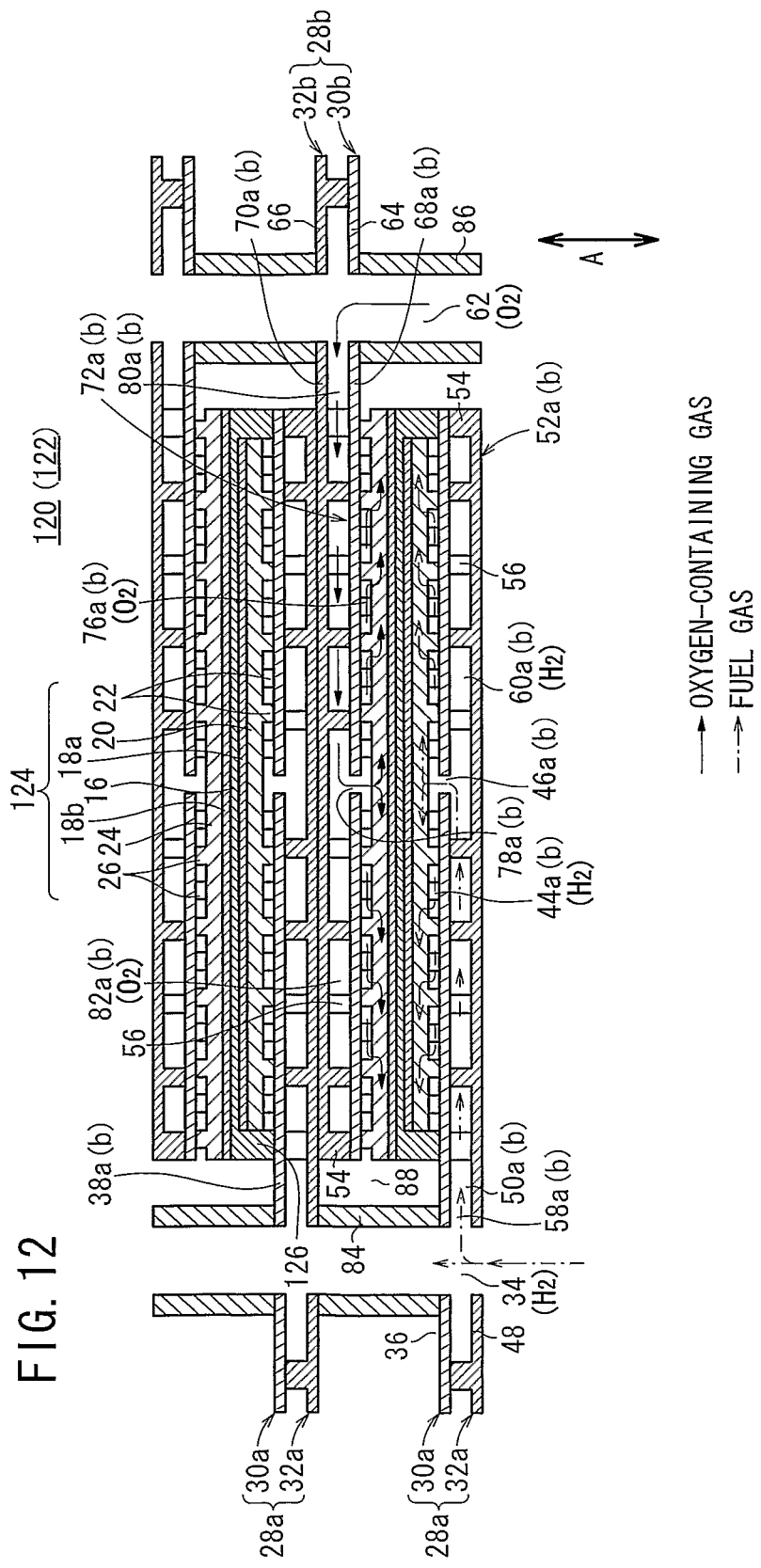
FIG. 12 is a cross sectional view showing a fuel cell stack formed by stacking the fuel cells.

The fuel cell 120 includes electrolyte electrode assemblies 124. The electrolyte electrode assembly 124 has an outer circumferential anode protrusion 126 at the anode 20 side. The outer circumferential anode protrusion 126 is made of material which is different from that of the anode projections 22. For example, the outer circumferential anode protrusion 126 is made of the same material as that of the electrolyte 16 and formed integrally with the electrolyte 16. The outer circumferential anode protrusion 126 covers the outer edge of the anode 20. The electrolyte 16 is formed into a U-shape in cross section, and thus, the outer circumferential anode protrusion 126 is formed integrally with the electrolyte 16 (see FIG. 12). In effect, the electrolyte electrode assembly 124 is fabricated according to the flow chart shown in FIG. 6.

In the third embodiment, the outer circumferential anode protrusion 126 is made of material which is different from that of the anode projections 22. Therefore, it is possible to adopt material having good sealing characteristics as material of the outer circumferential anode protrusion 126, and adopt material having good current collection characteristics as material of the anode projections 22. Accordingly, improvement in the power generation efficiency of the fuel cell 120 is achieved.

In particular, in the third embodiment, the outer circumferential anode protrusion 126 is made of the same material as that of the electrolyte 16, and formed integrally with the electrolyte 16. In the structure, the electrolyte 16 which is a dense body and has a relatively good sealing capability can be used as the outer circumferential anode protrusion 126. Thus, the production process is simplified, and the production cost is reduced. Further, improvement in the power generation efficiency of the fuel cell 120 is achieved.

The outer circumferential anode protrusion 126 may be made of crustal component material, glass material, and composite material of clay and plastic, for example. Although the third embodiment has been described in connection with the outer circumferential anode protrusion 126, for example, an outer circumferential cathode protrusion (not shown) made of material which is different from that of the cathode projections 26 may be provided at the cathode 24 side. Therefore, it is possible to adopt material having good sealing characteristics as material of the outer circumferential cathode protrusion, and adopt material having good current collection characteristics as material of the cathode projections 26. Accordingly, improvement in the power generation efficiency of the fuel cell 120 is achieved.

Further, the outer circumferential cathode protrusion may be made of the same material as that of the electrolyte 16, and formed integrally with the electrolyte 16. In the structure, the electrolyte 16 which is a dense body and has a relatively good sealing capability can be used as the outer circumferential cathode protrusion. Thus, the production process is simplified, and the production cost is reduced. Further, improvement in the power generation efficiency of the fuel cell 120 is achieved.

Figure 13:
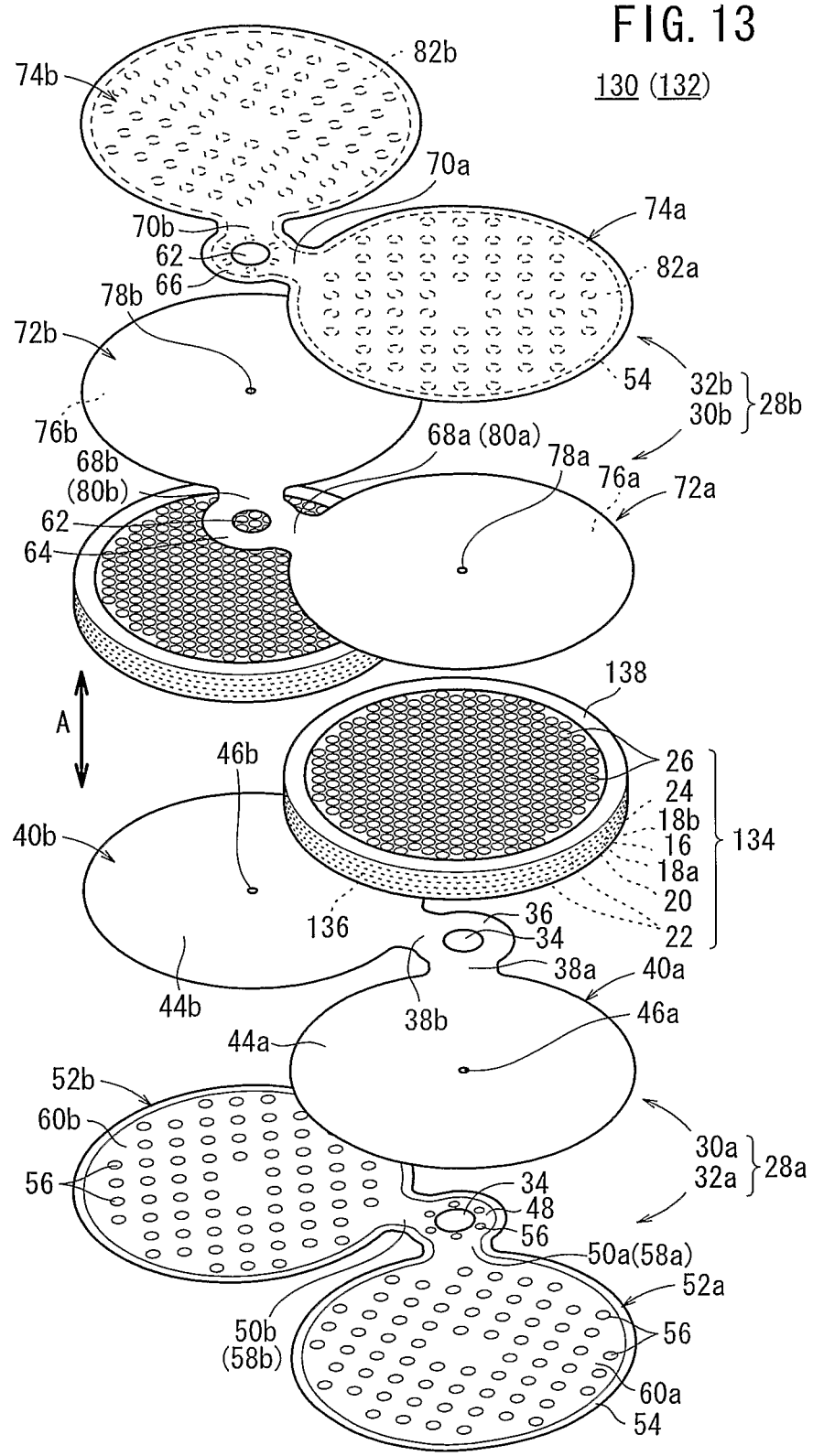
FIG. 13 is an exploded perspective view schematically showing a fuel cell stack formed by stacking fuel cells according to a fourth embodiment of the present invention.

FIG. 13 is an exploded perspective view schematically showing a fuel cell stack 132 formed by staking fuel cells 130 according to a fourth embodiment of the present invention.

Figure 14:
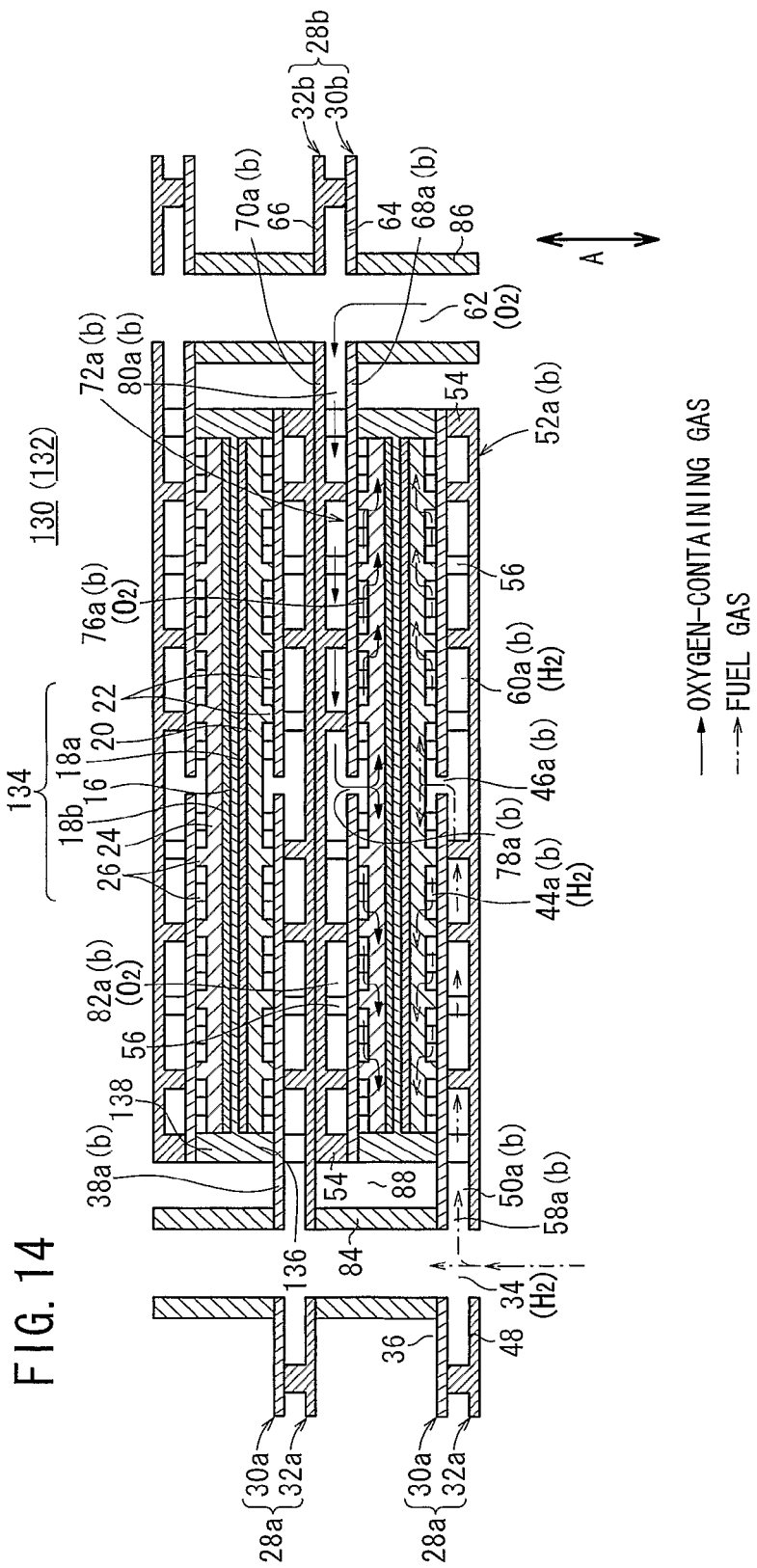
FIG. 14 is a cross sectional view showing a fuel cell stack formed by stacking the fuel cells.

The fuel cell 130 includes electrolyte electrode assemblies 134. As shown in FIGS. 13 and 14, the electrolyte electrode assembly 134 has an outer circumferential anode protrusion 136 formed around the anode projections 22, and an outer circumferential cathode protrusion 138 formed around the cathode projections 26.

The outer circumferential anode protrusion 136 is made of material which is different from that of the anode projections 22. The outer circumferential cathode protrusion 138 is made of material which is different from that of the cathode projections 26. In the fourth embodiment, the outer circumferential anode protrusion 136 and the outer circumferential cathode protrusion 138 are made of the same material as the electrolyte 16, and formed integrally with the electrolyte 16.

In the fourth embodiment, the electrolyte 16 which is a dense body and has a relatively good sealing capability can be used as the outer circumferential anode protrusion 136 and the outer circumferential cathode protrusion 138. Thus, the production process is simplified, and the production cost is reduced. Further, improvement in the power generation efficiency of the fuel cell 130 is achieved.

Figure 15:
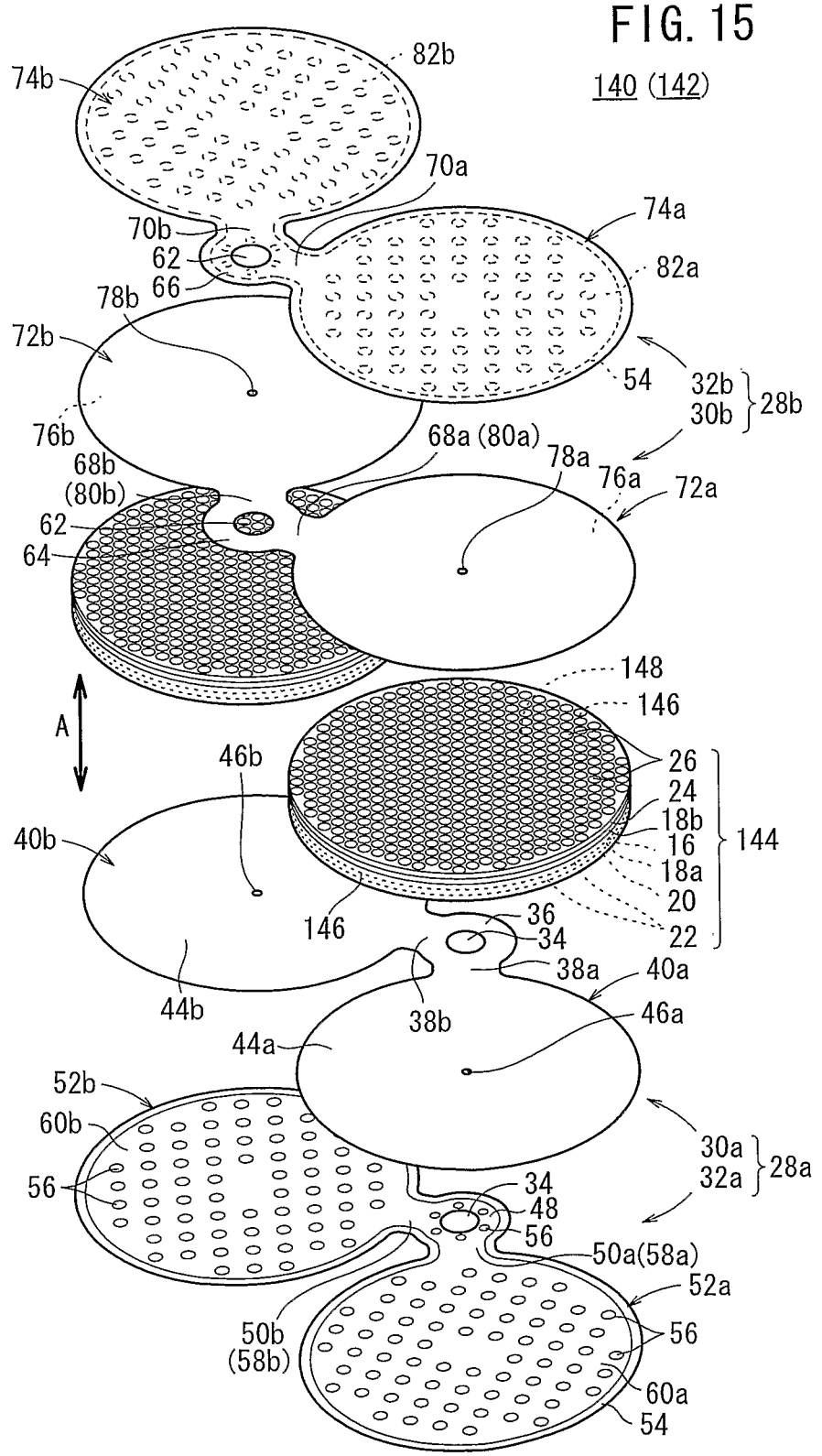
FIG. 15 is an exploded perspective view schematically showing a fuel cell stack formed by stacking fuel cells according to a fifth embodiment of the present invention.

FIG. 15 is an exploded perspective view schematically showing a fuel cell stack 142 formed by stacking fuel cells 140 according to a fifth embodiment of the present invention in a direction indicated by an arrow A.

Figure 16:
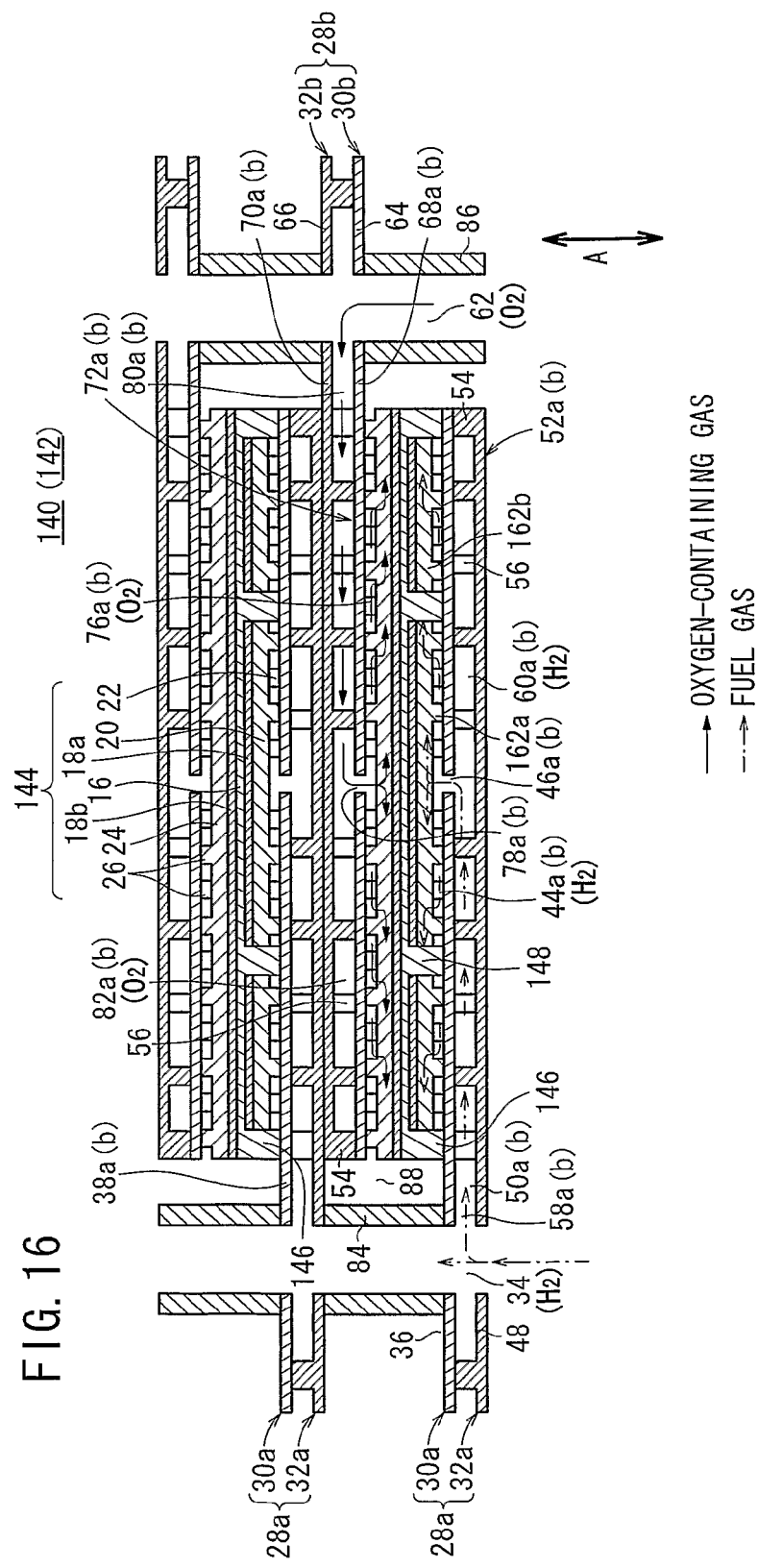
FIG. 16 is a cross sectional view showing a fuel cell stack formed by stacking the fuel cells.
Figure 17:
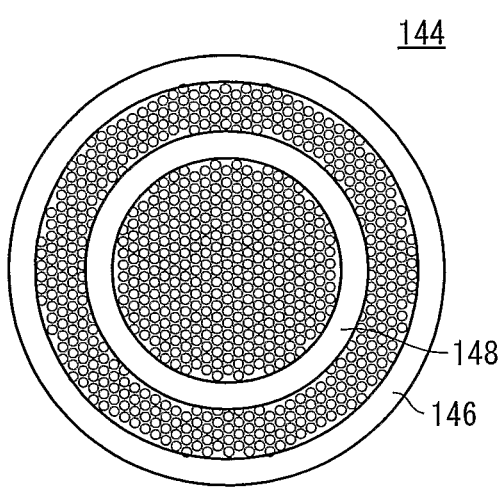
FIG. 17 is a front view showing an electrolyte electrode assembly of the fuel cell.

The fuel cell 140 includes electrolyte electrode assemblies 144. As shown in FIGS. 15 to 17, the electrolyte electrode assembly 144 has, at the anode 20 side, an outer circumferential anode protrusion 146 and a ring shaped reinforcement rib 148 provided inside the outer circumferential anode protrusion 146. The outer circumferential anode protrusion 146 and the reinforcement rib 148 are made of material which is different from that of the anode projections 22. For example, the outer circumferential anode protrusion 146 and the reinforcement rib 148 are made of the same material as that of the electrolyte 16, and formed integrally with the electrolyte 16.

In the fifth embodiment, the outer circumferential anode protrusion 146 and the reinforcement rib 148 are formed concentrically with each other, and integrally with the electrolyte 16. Therefore, in particular, the strength of the electrolyte electrode assembly 144 is maintained reliably. Further, the same advantages as in the case of the third embodiment are obtained.

Figure 18:
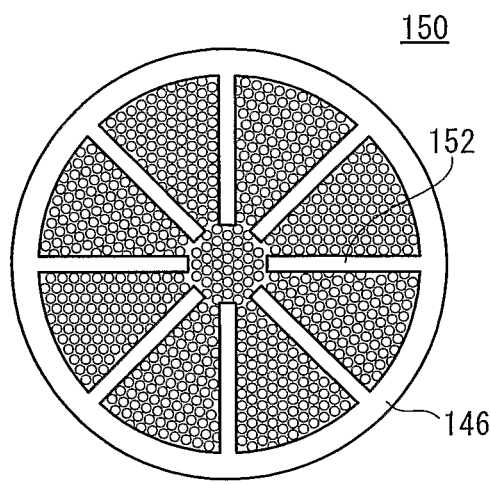
FIG. 18 is a front view showing an electrolyte electrode assembly of another fuel cell.

In the fifth embodiment, the single ring shaped reinforcement rib 148 is formed concentrically with the outer circumferential anode protrusion 146. However, the present invention is not limited in this respect. For example, in an electrolyte electrode assembly 150 shown in FIG. 18, a plurality of straight reinforcement ribs 152 extend from the outer circumferential anode protrusion 146 to the center of the electrolyte electrode assembly 150.

Figure 19:
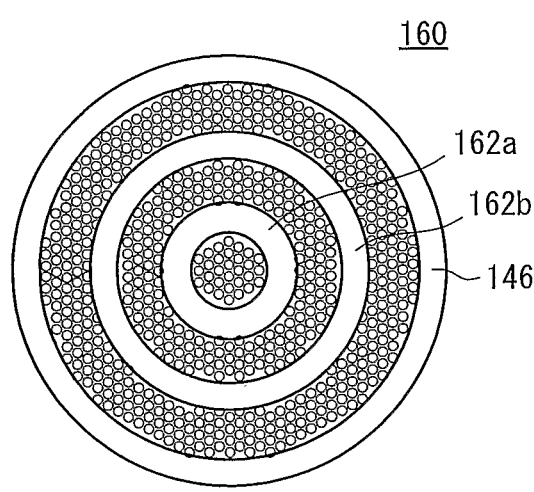
FIG. 19 is a front view showing an electrolyte electrode assembly of still another fuel cell.

Further, in an electrolyte electrode assembly 160 shown in FIG. 19, dual reinforcement ribs 162a, 162b are provided inside the outer circumferential anode protrusion 146, concentrically with the outer circumferential anode protrusion 146. In the electrolyte electrode assemblies 150, 160, the same advantages as in the electrolyte electrode assembly 144 are obtained.

Further, in the fifth embodiment, the electrolyte electrode assembly has, at the anode 20 side, the outer circumferential anode protrusion 146 and the reinforcement rib 148 which are formed integrally with the electrolyte 16. However, the present invention is not limited in this respect. For example, the anode 20 side may be provided with only the anode projections 22, whereas the cathode 24 side may be provided with, in addition to the cathode projections 26, the outer circumferential cathode protrusion and the reinforcement rib which are formed integrally with the electrolyte 16.

Alternatively, the anode projections 22 and the outer circumferential anode protrusion 146, and the reinforcement rib 148 may be provided on the anode 20 side, and the cathode projections 26, the outer circumferential cathode protrusion, and the reinforcement rib integrally with the electrolyte 16 may be provided on the cathode 24 side.

Figure 20:
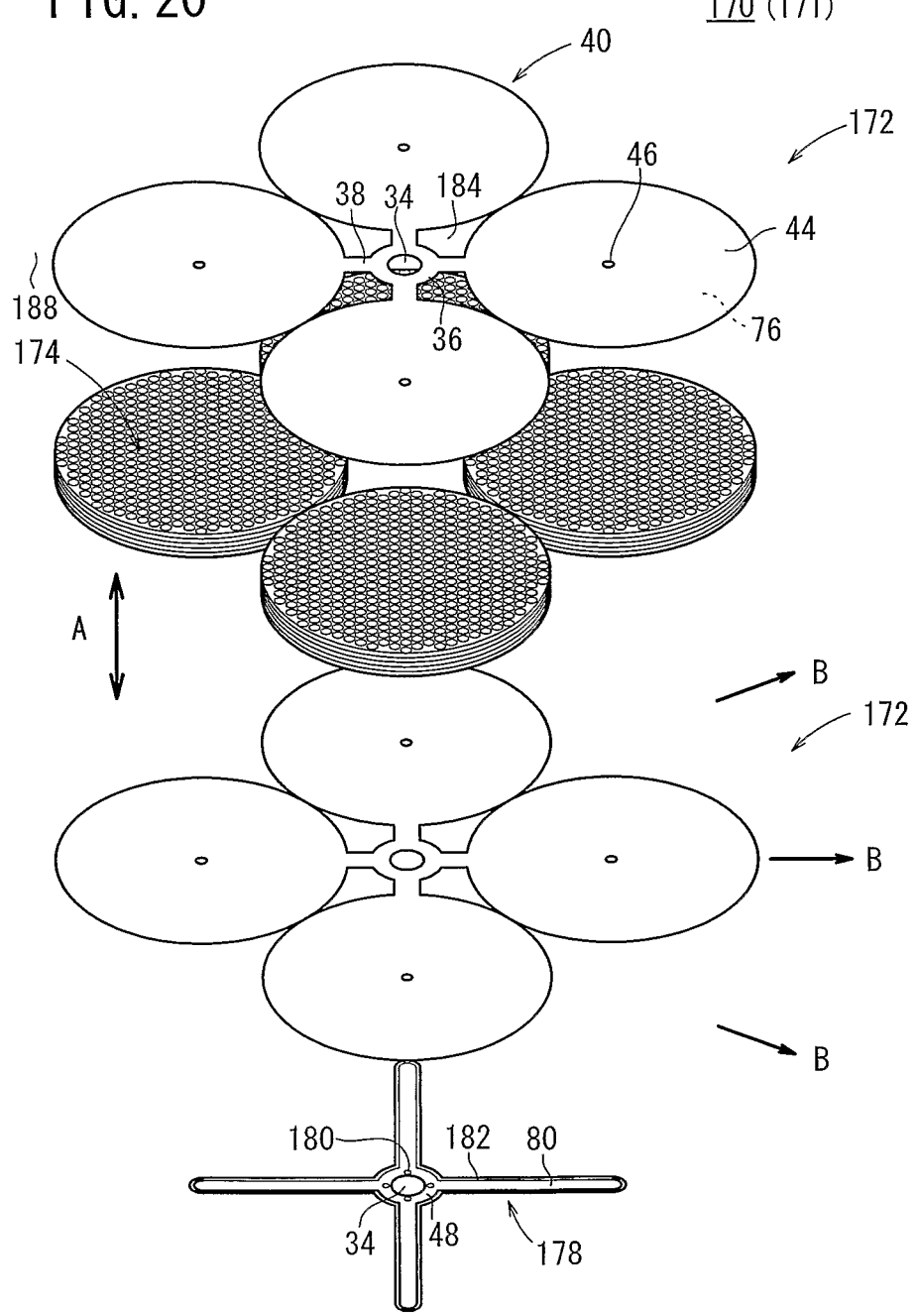
FIG. 20 is an exploded perspective view schematically showing a fuel cell stack formed by stacking fuel cells according to a sixth embodiment of the present invention.

FIG. 20 is an exploded perspective view schematically showing a fuel cell stack 171 formed by stacking fuel cells 170 according to a sixth embodiment in a direction indicated by an arrow A.

Figure 21:
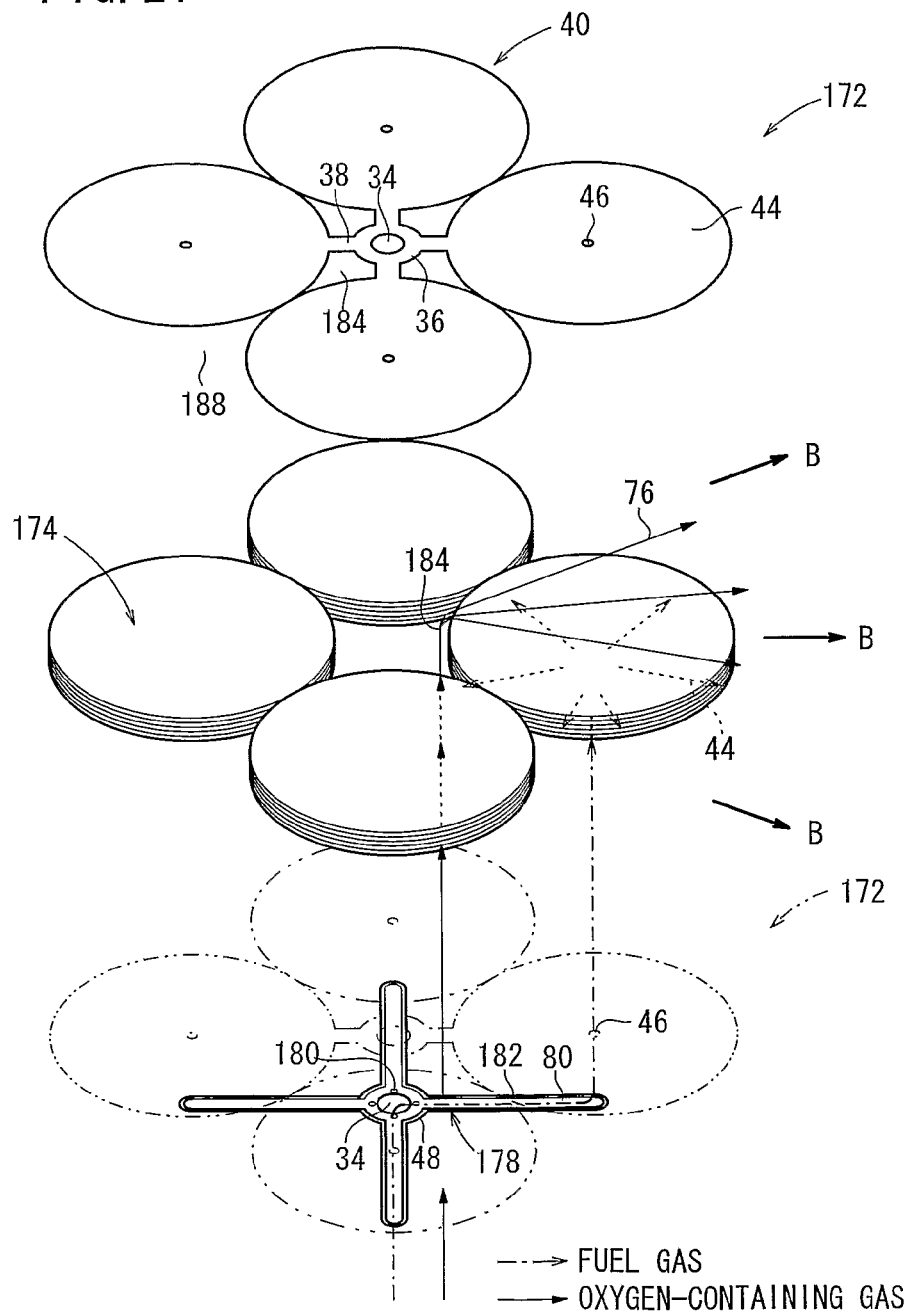
FIG. 21 is a partial exploded perspective view of the fuel cell showing gas flows of the fuel cell.

As shown in FIGS. 20 and 21, in the fuel cell 170, four electrolyte electrode assemblies 174 are provided between separators 172, on a circle concentric with a fuel gas supply passage 34 extending through the center of the separators 172.

Figure 22:
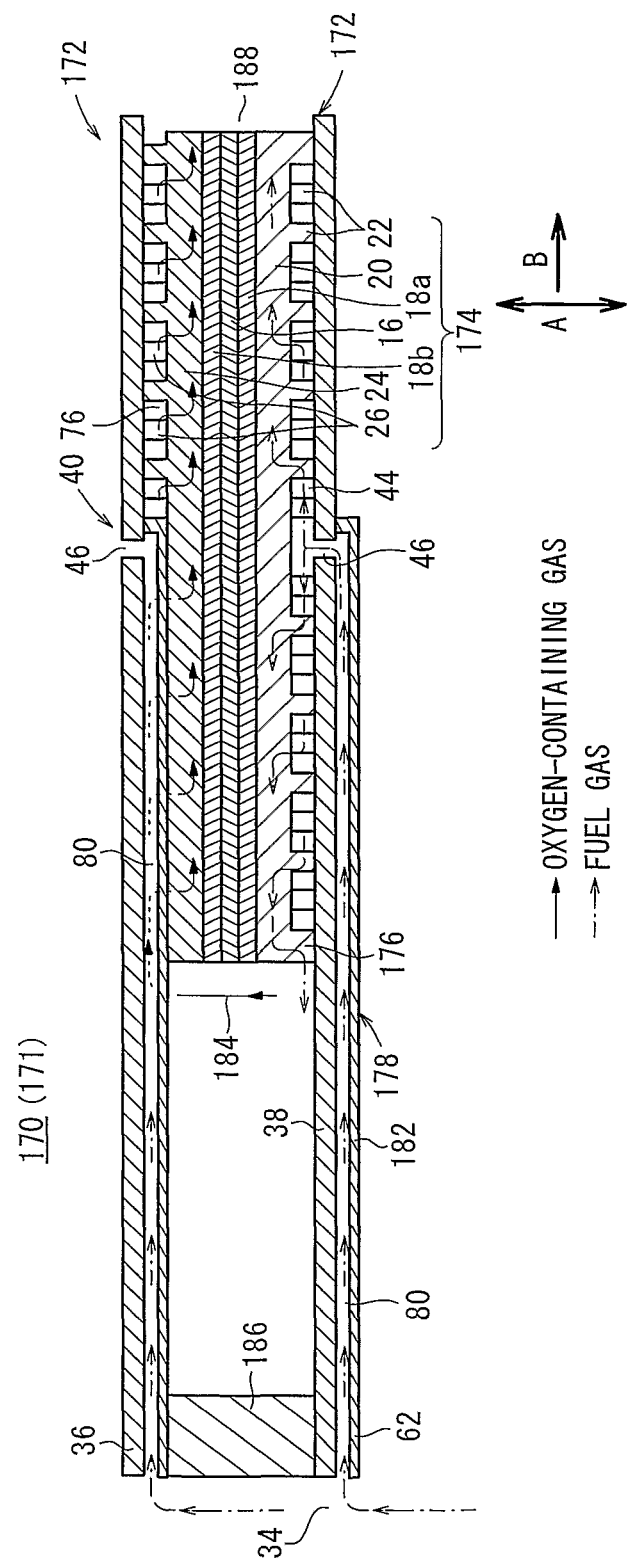
FIG. 22 is a cross sectional view schematically showing operation of the fuel cell.
Figure 23:
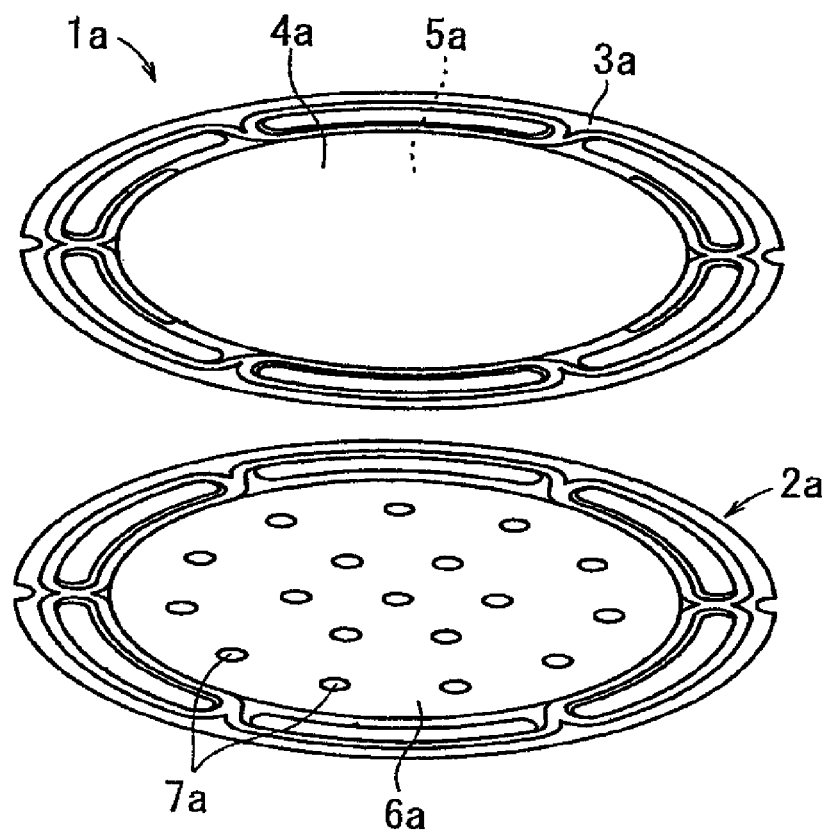
FIG. 23 is an exploded perspective view showing a fuel cell disclosed in Japanese Laid-Open Patent Publication No. 2004-522285 (PCT)
Figure 24:
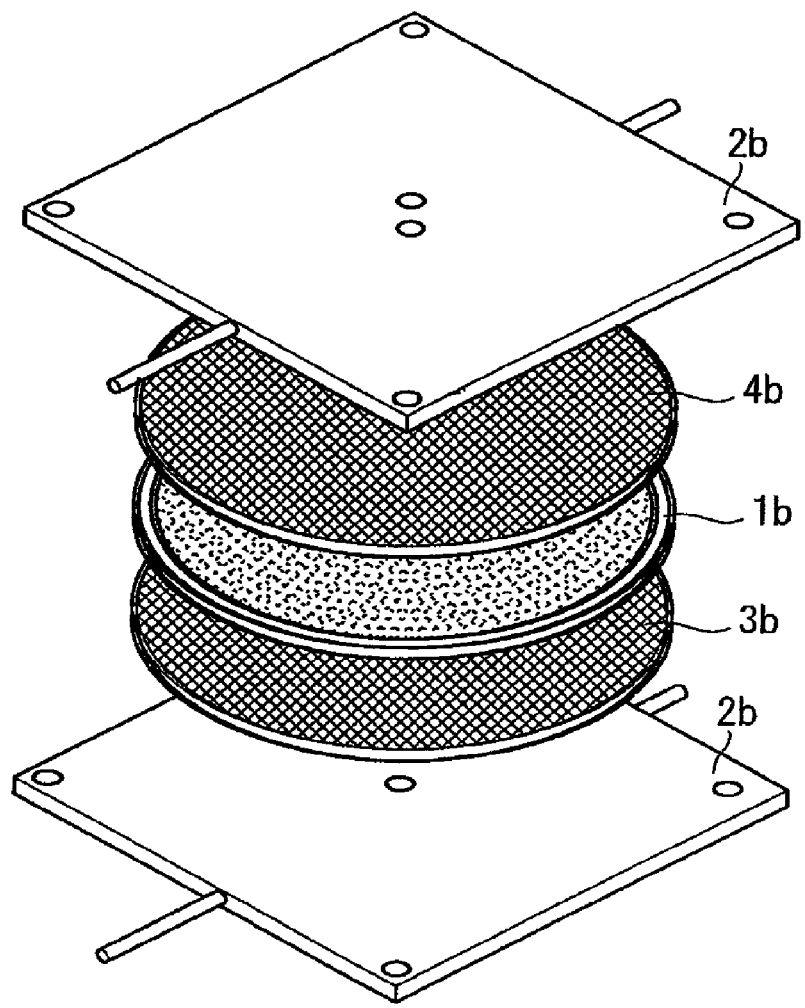
FIG. 24 is an exploded perspective view showing a fuel cell disclosed in Japanese Laid-Open Patent Publication No. 2002-237312.
Figure 25:
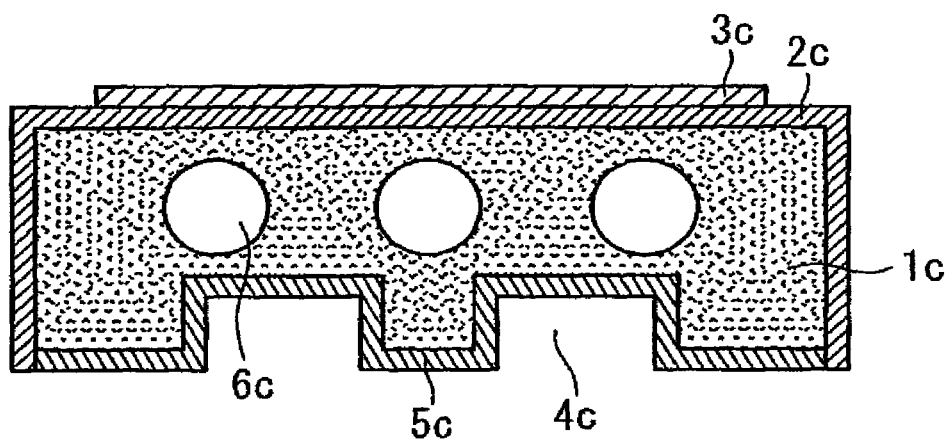
FIG. 25 is a cross sectional view showing a fuel cell disclosed in Japanese Laid-Open Patent Publication No. 2006-253071.

As shown in FIG. 22, in each of the electrolyte electrode assemblies 174, the anode 20 has a plurality of anode projections 22 and an outer circumferential anode protrusion 176 formed along the outer edge of the anode 20. The anode projections 22 and the outer circumferential anode protrusion 176 are made of the same material. For example, the anode projections 22 and the outer circumferential anode protrusion 176 are made of the same material as that of the anode 20.

For example, the separator 172 is made of a single metal plate such as a metal sheet of stainless alloy, or a carbon plate. A fuel gas supply section 36 is formed at the center of the separator 172, and a fuel gas supply passage 34 extends through the fuel gas supply section 36. Four first bridges 38 extend radially outwardly from the fuel gas supply section 36 at equal angular intervals, e.g., 90°. The fuel gas supply section 36 is integral with sandwiching sections 40 each having a relatively large diameter through the first bridges 38. The centers of the sandwiching sections 40 are equally distanced from the fuel gas supply section 36.

Each of the sandwiching sections 40 has a circular disk shape, having substantially the same dimensions as the electrolyte electrode assembly 174. The sandwiching sections 40 are separated from each other. A fuel gas inlet 46 for supplying the fuel gas is formed, e.g., at the center of the sandwiching section 40, or at a position deviated from the center of the sandwiching section 40 toward the upstream side in the flow direction of the oxygen-containing gas.

Each of the sandwiching sections 40 has a flat surface which contacts the anode projections 22. A fuel gas channel 44 for supplying the fuel gas along the electrode surface of the anode 20 is formed between the anode projections 22 and the flat surface.

Each of the sandwiching sections 40 has a flat surface which contacts the cathode projections 26. An oxygen-containing gas channel 76 for supplying an oxygen-containing gas along the electrode surface of the cathode 24 is formed between the cathode projections 26 and the flat surface.

A channel member 178 is fixed to a surface of the separator 172 facing the cathode 24, e.g., by brazing, diffusion bonding, or laser welding. The channel member 178 is made of a flat plate. The fuel gas supply passage 34 extends through a fuel gas supply section 48 formed at the center of the channel member 178. A predetermined number of reinforcement bosses 180 are formed in the fuel gas supply section 48.

Four second bridges 182 extend radially from the fuel gas supply section 48. Each of the second bridges 182 is fixed to the separator 172, extending from the first bridge 38 to the surface of the sandwiching section 40 to cover the fuel gas inlet 46 (see FIG. 22).

From the fuel gas supply section 48 to the second bridge 182, a fuel gas supply channel 80 connecting the fuel gas supply passage 34 to the fuel gas inlet 46 is formed. The fuel gas supply channel 80 is formed by, e.g., etching or pressure forming.

The oxygen-containing gas channel 76 is connected to the oxygen-containing gas supply passage 184 for supplying the oxygen-containing gas from a space between an inner circumferential edge of the electrolyte electrode assembly 174 and an inner circumferential edge of the sandwiching section 40 in a direction indicated by an arrow B. The oxygen-containing gas supply passage 184 extends in the stacking direction indicated by the arrow A, between the inner circumferential edges of the sandwiching sections 40 and the respective first bridges 38.

An insulating seal 186 for sealing the fuel gas supply passage 34 is provided between the separators 172. The insulating seal 186 is made of crustal component material such as mica material and ceramic material, glass material or composite material of clay and plastic. The insulating seal 186 seals the fuel gas supply passage 34 from the electrolyte electrode assemblies 174. An exhaust gas channel 188 is provided outside (around) the sandwiching sections 40 of the fuel cells 170.

In the fuel cell 170, the fuel gas is supplied to the fuel gas supply passage 34, and the air as the oxygen-containing gas is supplied to each oxygen-containing gas supply passage 184.

As shown in FIG. 22, the fuel gas flows through the fuel gas supply passage 34 of the fuel cell stack 171 in the direction indicated by the arrow A, and the fuel gas flows through the fuel gas supply channel 80 in each fuel cell 170 to move along the surfaces of the separators 172.

The fuel gas from the fuel gas supply channel 80 flows through the fuel gas inlet 46 formed in the sandwiching section 40 into the fuel gas channel 44. After the fuel gas flows from the fuel gas inlet 46 to substantially the central region of the anode 20, the fuel gas flows along the fuel gas channel 44 toward the outer circumferential region of the anode 20.

In the meanwhile, the air is supplied to the oxygen-containing gas supply passage 184, and then, the oxygen-containing gas (air) flows in the direction indicated by the arrow B through the space between the inner circumferential edge of the electrolyte electrode assembly 174 and the inner circumferential edge of the sandwiching section 40, and flows to the oxygen-containing gas channel 76. In the oxygen-containing gas channel 76, the oxygen-containing gas flows from the inner circumferential edge (center of the separator 172) to the outer circumferential edge (outer circumferential edge of the separator 172) of the cathode 24, i.e., from one end to the other end of the cathode 24 of the electrolyte electrode assembly 174.

Thus, in each of the electrolyte electrode assemblies 174, the fuel gas flows from the center to the outer circumferential side on the electrode surface of the anode 20, and the oxygen-containing gas flows in one direction indicated by the arrow B on the electrode surface of the cathode 24. At this time, oxygen ions move through the electrolyte 16 toward the anode 20 for generating electricity by electrochemical reactions.

The exhaust gas chiefly containing the air after consumption in the power generation reaction is discharged to the outer circumferential region of each of the electrolyte electrode assemblies 174 and flows through the exhaust gas channel 188 as an off gas, and the off gas is discharged from the fuel cell stack 171.

In the sixth embodiment, the anode 20 of the electrolyte electrode assembly 174 has the anode projections 22 and the ring shaped outer circumferential anode protrusion 176. The anode projections 22 and the ring shaped outer circumferential anode protrusion 176 are made of the same material as that of the anode 20, and formed integrally with the anode 20. Thus, with the simple structure, the separator 172 tightly contacts the outer circumferential anode protrusion 176. Improvement in power collection efficiency is achieved advantageously. Further, non-uniform load applied to the electrolyte electrode assembly 174 is reduced. Accordingly, the power generation efficiency and the durability of the fuel cell 170 are improved easily.

Further, it becomes possible to prevent entering of the unconsumed oxygen-containing gas and the exhaust gas from the outside of the electrolyte electrode assembly 174 into the anode 20. Accordingly, decrease in the power generation efficiency due to oxidation of the anode 20 is suppressed, and improvement in the durability of the fuel cell 170 is achieved easily.

Further, flow-through to the outside of the fuel gas flowing in the fuel gas channels 44 is reliably prevented. Thus, the fuel gas can be utilized effectively in power generation reaction. Accordingly, improvement in the fuel utilization ratio is achieved advantageously.

Moreover, since the outer circumferential anode protrusion 176 and the anode projections 22 are made of the same material, the outer circumferential anode protrusion 176 and the anode projections 22 can be formed at the same time. The production process is simplified, and thus, reduction in the production cost is achieved.

In the sixth embodiment, the outer circumferential anode protrusion 176 and the anode projections 22 are made of the same material. However, the present invention is not limited in this respect. The outer circumferential anode protrusion 176 may be made of the same material as that of the electrolyte 16.

Further, on the anode 20 side, reinforcement ribs (FIGS. 17 to 19) made of the same material as that of the electrolyte 16 may be formed integrally with the electrolyte 16.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell including an electrolyte electrode assembly and separators sandwiching the electrolyte electrode assembly, the electrolyte electrode assembly including an anode, a cathode, and an electrolyte interposed between the anode and the cathode, the separators including a first separator and a second separator,
   wherein an entire planar surface of each of the first separator and the second separator stacked on and facing the electrolyte electrode assembly is substantially planar; and
   at least one of the anode and the cathode of the electrolyte electrode assembly has a plurality of projections, wherein adjacent three projections of the plurality of projections are arranged at respective vertices of a virtual equilateral triangle,
   the projections are integrally formed on at least one of the anode and the cathode of the electrolyte electrode assembly,
   the plurality of projections contact at least one of the first separator and the second separator,
   the plurality of projections form a reactant gas channel between the first separator or the second separator and the anode or the cathode,
   wherein at least one of the anode and the cathode of the electrolyte electrode assembly has an outer circumferential protrusion, and the outer circumferential protrusion contacts the first separator or the second separator, and is provided along the outer edge of the anode or the cathode, and
   wherein at least one of the anode and the cathode of the electrolyte electrode assembly has a reinforcement rib, and the reinforcement rib extends onto an electrode surface and is made of the same material as that of the plurality of projections or that of the electrolyte.

2. A fuel cell according to claim 1, wherein the plurality of projections include first projections provided on the anode and second projections provided on the cathode;
   the first projections contact the first separator, and form a fuel gas channel serving as the reactant gas channel between the anode and the first separator; and
   the second projections contact the second separator, and form an oxygen-containing gas channel serving as the reactant gas channel between the cathode and the second separator.

3. A fuel cell according to claim 2, wherein a number of the first projections and the second projections arranged in a same phase with each other in a stacking direction of the separators are larger than the number of the first projections and the second projections arranged in a different phase with each other in the stacking direction.

4. A fuel cell according to claim 1, wherein the outer circumferential protrusion includes a first outer circumferential protrusion provided on the anode and a second outer circumferential protrusion provided on the cathode;
   the first outer circumferential protrusion contacts the first separator, and is provided along the outer edge of the anode; and
   the second outer circumferential protrusion contacts the second separator, and is provided along the outer edge of the cathode.

5. A fuel cell according to claim 1, wherein the outer circumferential protrusion is made of the same material as that of the plurality of projections.

6. A fuel cell according to claim 4, wherein the first outer circumferential protrusion is made of the same material as that of the first projections.

7. A fuel cell according to claim 4, wherein the second outer circumferential protrusion is made of the same material as that of the second projections.

8. A fuel cell according to claim 1, wherein the outer circumferential protrusion is made of material which is different from that of the plurality of projections.

9. A fuel cell according to claim 4, wherein the first outer circumferential protrusion is made of material which is different from that of the first projections.

10. A fuel cell according to claim 4, wherein the second outer circumferential protrusion is made of material which is different from that of the second projections.

11. A fuel cell according to claim 1, wherein the outer circumferential protrusion is made of the same material as that of the electrolyte;
   the outer circumferential protrusion is formed integrally with the electrolyte; and
   the electrolyte including the outer circumferential protrusion is formed into a U-shape in the cross section.

12. A fuel cell according to claim 4, wherein the first outer circumferential protrusion is made of the same material as that of the electrolyte; and
   the first outer circumferential protrusion is formed integrally with the electrolyte.

13. A fuel cell according to claim 4, wherein the second outer circumferential protrusion is made of the same material as that of the electrolyte; and
   the second outer circumferential protrusion is formed integrally with the electrolyte.

14. A fuel cell according to claim 1 wherein the fuel cell is a flat plate type solid oxide fuel cell.

* * * * *